US010621173B2

(12) United States Patent
Oyamada

(10) Patent No.: US 10,621,173 B2
(45) Date of Patent: Apr. 14, 2020

(54) DATA PROCESSING DEVICE, DATA PROCESSING METHOD, AND RECORDING MEDIUM

(71) Applicant: NEC CORPORATION, Tokyo (JP)

(72) Inventor: Masafumi Oyamada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 359 days.

(21) Appl. No.: 15/503,737

(22) PCT Filed: Aug. 18, 2015

(86) PCT No.: PCT/JP2015/004090
§ 371 (c)(1),
(2) Date: Feb. 14, 2017

(87) PCT Pub. No.: WO2016/027451
PCT Pub. Date: Feb. 25, 2016

(65) Prior Publication Data
US 2017/0277752 A1 Sep. 28, 2017

(30) Foreign Application Priority Data

Aug. 19, 2014 (JP) ................................ 2014-166753

(51) Int. Cl.
G06F 16/2455 (2019.01)
G06F 16/22 (2019.01)
(Continued)

(52) U.S. Cl.
CPC .......... G06F 16/24554 (2019.01); G06F 7/08 (2013.01); G06F 16/2282 (2019.01); G06F 16/2462 (2019.01); G06F 16/24539 (2019.01)

(58) Field of Classification Search
None
See application file for complete search history.

(56) References Cited

U.S. PATENT DOCUMENTS 5,537,589 A 7/1996 Dalal
2008/0109423 A1* 5/2008 Barsness ............ G06F 16/2425
2015/0286681 A1* 10/2015 Baer ................. G06F 16/24554
707/754

FOREIGN PATENT DOCUMENTS

JP 09-265479 A 10/1997
JP 2006-259790 A 9/2006
JP 2007-011548 A 1/2007

OTHER PUBLICATIONS

Yin Huai et al., "Major Technical Advancements in Apache Hive", SIGMOD '14, Proceedings of the 2014 ACM SIGMOD international conference on Management of data, Jun. 18, 2014, pp. 1235-1246.

(Continued)

Primary Examiner — Robert W Beausoliel, Jr.
Assistant Examiner — Hau Hoang
(74) Attorney, Agent, or Firm — Sughrue Mion, PLLC

(57) ABSTRACT

A data processing device according to the present invention includes: a partition unit that horizontally partitions records included in table data into a plurality of blocks, the horizontal partitioning indicating partitioning that uses records as a unit; a statistical value calculation unit that calculates, for each of the blocks, a statistical value of an attribute included in the records of the block; a determination unit that determines, when processing a query for performing aggregation processing after record selection processing with respect to the table data, based on the statistical value, for each of the blocks, whether all records in the block are selected or not based on the selection processing; and a query execution unit that uses, for a block determined that all records are selected based on the determination unit, the statistical value of the determined block as a result of the query for the determined block.

6 Claims, 24 Drawing Sheets

(51) Int. Cl.
*G06F 16/2458* (2019.01)
*G06F 16/2453* (2019.01)
*G06F 7/08* (2006.01)

(56) References Cited

OTHER PUBLICATIONS

Liwen Sun et al., "A Partitioning Framework for Aggressive Data Skipping", Proceedings of the VLDB Endowment, Aug. 1, 2014, pp. 1617-1620, vol. 7 Issue 13.
Written Opinion for PCT/JP2015/004090, dated Nov. 10, 2015.
International Search Report for PCT/JP2015/004090, dated Nov. 10, 2015.

\* cited by examiner

```
SELECT MAX (Height)
FROM    Staff
```

```
SELECT MAX (Height)
FROM    Staff
WHERE   NOT EXISTS
 (SELECT 1
  FROM      Retired
  WHERE     Retired.ID = Staff.ID)
```

US 10,621,173 B2

DATA PROCESSING DEVICE, DATA PROCESSING METHOD, AND RECORDING MEDIUM

CROSS REFERENCE TO RELATED APPLICATIONS

This is a National Stage of International Application No. PCT/JP2015/004090 filed Aug. 18, 2015, claiming priority based on Japanese Patent Application No. 2014-166753 filed Aug. 19, 2014, the contents of all of which are incorporated herein by reference in their entirety.

TECHNICAL FIELD

The present invention relates to a data processing device, a data processing method, and a recording medium.

BACKGROUND ART

In the above technical field, in order to accelerate attribute aggregation processing, a technique disclosed in NPL 1 uses an index described therein (hereinafter, a lightweight index) in the aggregation processing. The technique disclosed in NPL 1 omits scanning of records by using the lightweight index and reduces an input/output (I/O) amount of data to/from a storage and a computation amount. NPL 1 discloses such the technique of accelerating attribute aggregation processing.

For example, the technique described in NPL 1 typically performs query processing as in FIG. 20 with respect to processing of a query 1900 illustrated in FIG. 19 for calculating (selecting) a maximum value (MAX) among heights (Height) of employees (Staff). In other words, the technique described in NPL 1 executes attribute selection 2002 on table data 2001 and finds a solution 2003.

As illustrated in FIG. 21, the technique described in NPL 1 horizontally partitions large table data 2101 into a plurality of partitions called blocks 2111 to 2113 and saves the blocks respectively assigned with lightweight indexes 2114 to 2116. Then, the technique described in NPL 1 scans the lightweight indexes 2114 to 2116 with respect to Height attribute (height) for the blocks, acquires maximum values 2117 to 2119 of the heights in the blocks, and computes (selects) a maximum value among the acquired maximum values. The technique described in NPL 1 computes a maximum value of the heights in the entire table data 2101 based on the above-described operation. An I/O amount necessary for a series of processing at this time may be an I/O amount in the scanning of the lightweight indexes for the respective blocks. In addition, processing of computing a maximum value may be performed by computing a maximum value from the maximum values obtained from the respective blocks. Consequently, the technique described in NPL 1 is faster than simple processing which requires scanning and computation for all blocks.

CITATION LIST

Non Patent Literature

[NPL 1] Y. Huai, Ashutosh Chauhan, Alan Gates, Gunther Haqleitner, Eric n. Hanson, Owen O'Malley, Jitendra Pandy, Yuan, Ruboa Lee, and Xiaodong Zhang, "Major Technical Advancements in Apache Hive", SIGMOD '14, Proceedings of the 2014 ACM SIGMOD international conference on Management of data, pp. 1235-1246, Jun. 18, 2014

SUMMARY OF INVENTION

Technical Problem

However, the technique described in NPL 1 is only applicable to a simple query. For an example of a query to which the technique described in NPL 1 is not applicable, a query 2200 illustrated in FIG. 22 is assumed. The query 2200 illustrated in FIG. 22 is a query for computing a maximum height among existing employees. In the query 2200, a record (a row in a table) to be a target of aggregation in a table "Staff" is limited to a record not included (NOT EXISTS) in a table "Retired" storing IDs of retired employees.

FIG. 23 is a diagram illustrating an execution example of the query 2200 in FIG. 22. In FIG. 23, a block 2111 in table data 2101 includes two records 2301 and 2302 of employees who have retired (records of ID=2 and ID=4). Thus, a record to be a target of aggregation is a record of ID=1 (height=178.0) and a record of ID=3 (height=152.5). A maximum value for the query 2200 is "178.0" in the block 2111. However, a lightweight index 2114 of the block 2111 stores a height 190.0 (a maximum value 2117) of a retired employee (ID=2) as a maximum height. This stored value is a value which is unusable for calculating a result of the query 2200. As described above, there is a problem that the technique described in NPL 1 is unable to calculate a valid value when a target of aggregation processing is a result of record selection processing.

An object of the present invention is to provide a technique for solving the above-described problem.

Solution to Problem

For achieving the above-object, a data processing device according to an aspect of the present invention includes:
  a partition unit that horizontally partitions records included in table data into a plurality of blocks, the horizontal partitioning indicating partitioning that uses records as a unit;
  a statistical value calculation unit that calculates, for each of the blocks, a statistical value of an attribute included in the records of the block;
  a determination unit that determines, when processing a query for performing aggregation processing after record selection processing with respect to the table data, based on the statistical value, for each of the blocks, whether all records in the block are selected or not based on the selection processing; and
  a query execution unit that uses, for a block determined that all records are selected based on the determination unit, the statistical value of the determined block as a result of the query for the determined block.

For achieving the above-object, a data processing method according to the present invention includes:
  horizontally partitioning records included in table data into a plurality of blocks, the horizontal partitioning indicating partitioning that uses records as a unit;
  calculating, for each of the blocks, a statistical value of an attribute included in the records of the block;
  determining, when processing a query for performing aggregation processing after record selection processing with respect to the table data, based on the statistical value, for each of the blocks, whether all records in the block are selected or not based on the selection processing; and using, for a block determined that all records are selected based on the determination, the statistical value of the determined block as a result of the query for the determined block.

For achieving the above-object, a computer readable non-transitory recording medium embodying a program, the program causing a computer device to perform a method, the method includes:

horizontally partitioning records included in table data into a plurality of blocks, the horizontal partitioning indicating partitioning that uses records as a unit;

calculating, for each of the blocks, a statistical value of an attribute included in the records of the block;

determining, when processing a query for performing aggregation processing after record selection processing with respect to the table data, based on the statistical value for each of the blocks, whether all records in the block are selected or not based on the selection processing; and using, for a block determined that all records are selected based on the determination processing, the statistical value of the determined block as a result of the query for the determined block.

Advantageous Effects of Invention

Based on the present invention, it is possible to exhibit an advantageous effect of accelerating aggregation processing more flexibly.

BRIEF DESCRIPTION OF DRAWINGS

FIG. 19 is a diagram exemplifying a query for finding a maximum height among employees;

FIG. 22 is a diagram illustrating a query for aggregation processing of calculating a maximum height among existing employees;

DESCRIPTION OF EMBODIMENTS

In the following, example embodiments of the present invention will be described in detail with reference to the drawings in an exemplified manner. However, components described in the following example embodiments are merely for illustrative purpose, and are not intended to limit the technical scope of the present invention thereto.

First Example Embodiment

Figure 1:
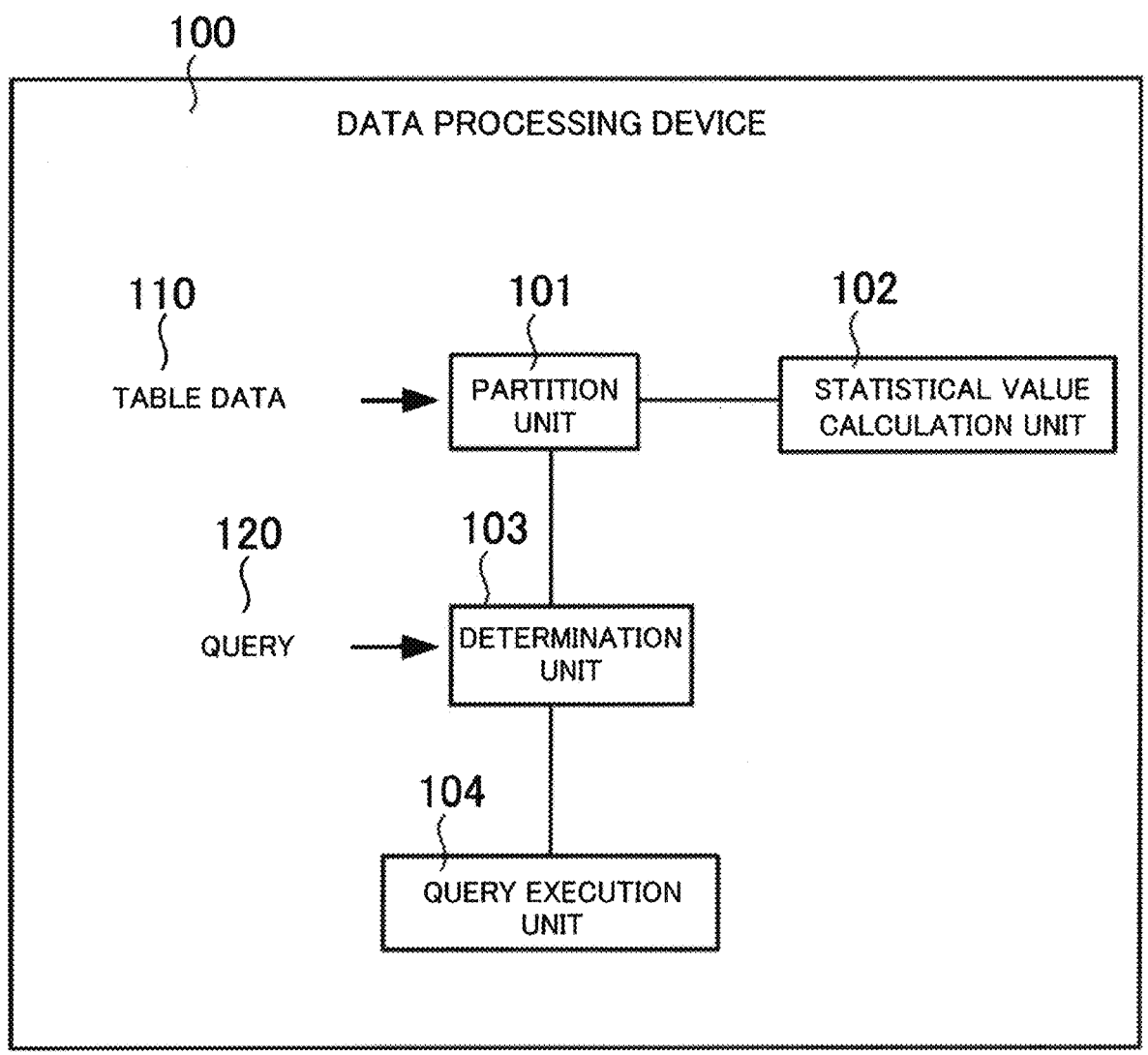
FIG. 1 is a block diagram illustrating a configuration of a data processing device according to a first example embodiment of the present invention.

A data processing device 100 as a first example embodiment of the present invention is described with use of FIG. 1. As illustrated in FIG. 1, the data processing device 100 includes a partition unit 101, a statistical value calculation unit 102, a determination unit 103, and a query execution unit 104.

The partition unit 101 horizontally partitions table data 110 into a plurality of blocks. Herein, the horizontal partitioning indicates partitioning which uses records, each being a unit of data, as a unit of each partition. The statistical value calculation unit 102 calculates a statistical value of an attribute for each of the partitioned blocks. The determination unit 103, when processing a query 120 for performing aggregation processing after record selection processing with respect to the table data 110, determines, for each of the blocks, whether all records in the block are selected or not in the selection processing. Note that the above description also indicates that the determination unit 103 determines whether all records in the block are selected or not in the selection processing without referencing data of the records in the block.

The query execution unit 104 uses, when the determination unit 103 determines that all records in the block are selected, the statistical value of the block as a result of the query 120 for the block.

(Advantageous Effect)

The example embodiment uses, when determining that all records in a block are selected, a statistical value of the block as a result of a query for the block. Therefore, the present example embodiment is capable of exhibiting an advantageous effect of accelerating aggregation processing more flexibly.

The detailed reason is as follows. The partition unit 101 horizontally partitions the table data 110 into a plurality of blocks. The statistical value calculation unit 102 calculates a statistical value of an attribute for each of the partitioned blocks. The determination unit 103, when processing the query 120 for performing aggregation processing after record selection processing with respect to the table data 110, determines, for each of the blocks, whether all records in the block are selected or not based on the selection processing. Then, the query execution unit 104 uses, when the determination unit 103 determines that all records in the block are selected, the statistical value of the block as a result of the query 120 for the block.

Second Example Embodiment (Premise Technique)

A Relational Database Management System (hereinafter, referred to as RDBMS) holds a set of data in a table form which uses rows and columns based on a relational model (hereinafter, the set of data is called table or table data). The RDBMS provides a user of the RDBMS with means for effectively retrieving and updating data. A row, which is a unit of data in a table, is called "record". In other words, the record represents a piece of data. The record (data) includes one or a plurality of attributes. A column in a table corresponds to each of the attributes. Note that a list of <column name and data type> of the column included in a table is called a "schema" of the table.

A user of the RDBMS instructs the RDBMS to perform retrieval or update processing on a table by using a programming language. The instruction is called query. To create a query, a programming language called SQL is used standardly. The use of the SQL enables the user of the RDBMS to simply and effectively extract a record matching with a condition from a table. In addition, the use of the SQL enables the user of the RDBMS to extract a necessary attribute from among records by specifying a column name.

One of frequently performed processing in the RDBMS is attribute aggregation processing. The attribute aggregation processing is processing of computing some aggregation value from a group of values of a certain attribute in a table. Examples of the aggregation values include a maximum value, a minimum value, an average value, or a standard deviation. The attribute aggregation processing is often performed with respect to all or most of records in a table. Thus, the aggregation processing of a huge table results in scanning (examining) a large quantity of records, which accordingly generates a large amount of I/O processing and computation processing. As a result, a processing speed is prolonged largely.

(Functional Configuration of Data Processing Device 200)

Figure 2:
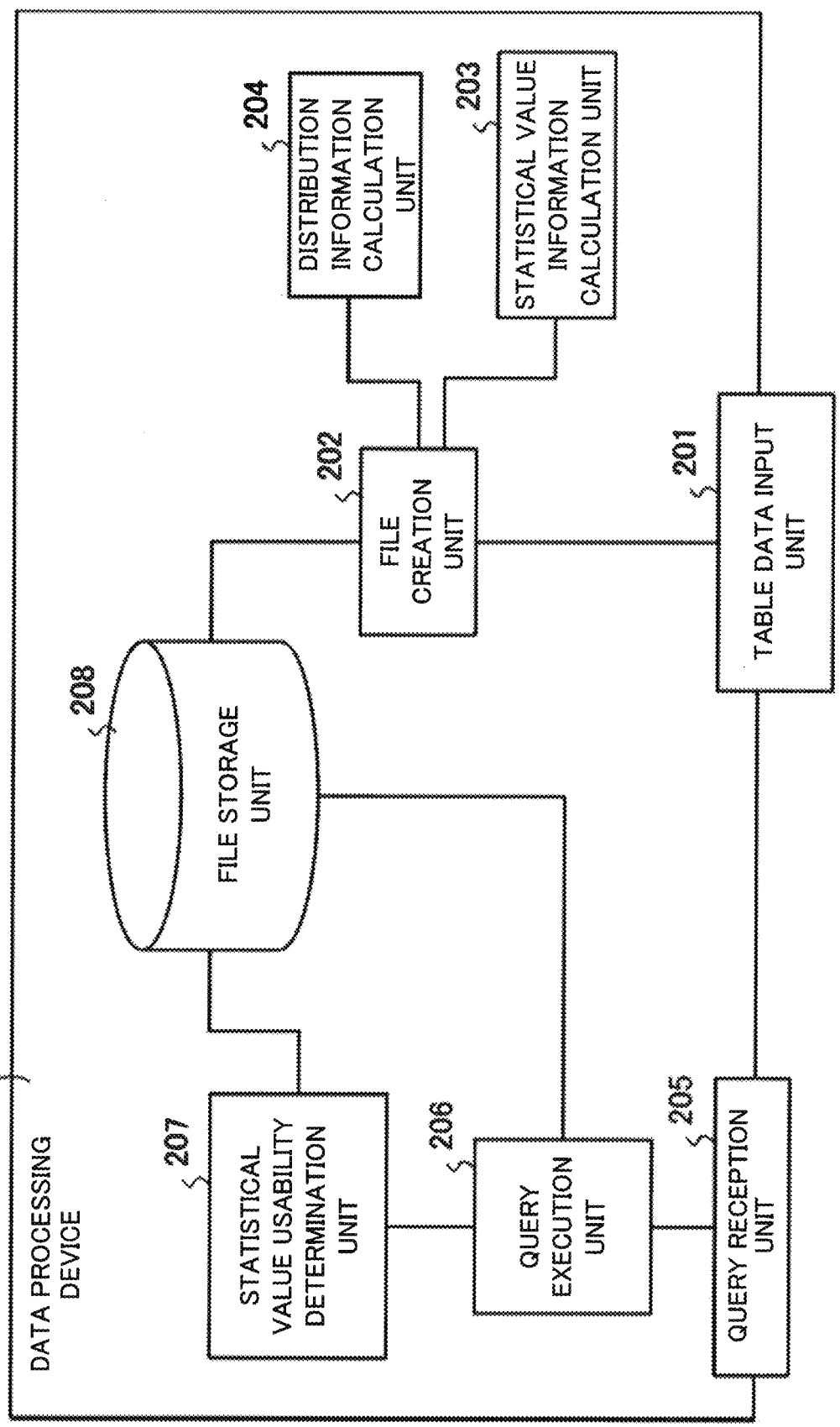
FIG. 2 is a block diagram illustrating a functional configuration of a data processing device according to a second example embodiment.

Next, a data processing device 200 according to a second example embodiment of the present invention is described with use of FIG. 2. FIG. 2 is a block diagram illustrating a configuration of the data processing device 200 according to the present example embodiment. In FIG. 2, each block illustrates not a configuration on a hardware unit but a configuration on a function unit.

The data processing device 200 includes a table data input unit 201, a file creation unit 202, a statistical value information calculation unit 203, a distribution information calculation unit 204, a query reception unit 205, a query execution unit 206, a statistical value usability determination unit 207, and a file storage unit 208. Hereinafter, each of the above is described. Note that the file creation unit 202 is equivalent to the partition unit 101 according to the first example embodiment. The statistical value information calculation unit 203 is equivalent to the statistical value calculation unit 102. The statistical value usability determination unit 207 is equivalent to the determination unit 103. The query execution unit 206 is equivalent to the query execution unit 104.

(Table Data Input Unit 201)

The table data input unit 201 acquires table data (table). The table data (table) is data in a table form. Rows in the table data are records. In addition, each column of the records is an attribute of the records. In addition, the table data (table) includes information of a schema constituted of a column name, a data type and the like of a column included in the table data.

Figure 3:
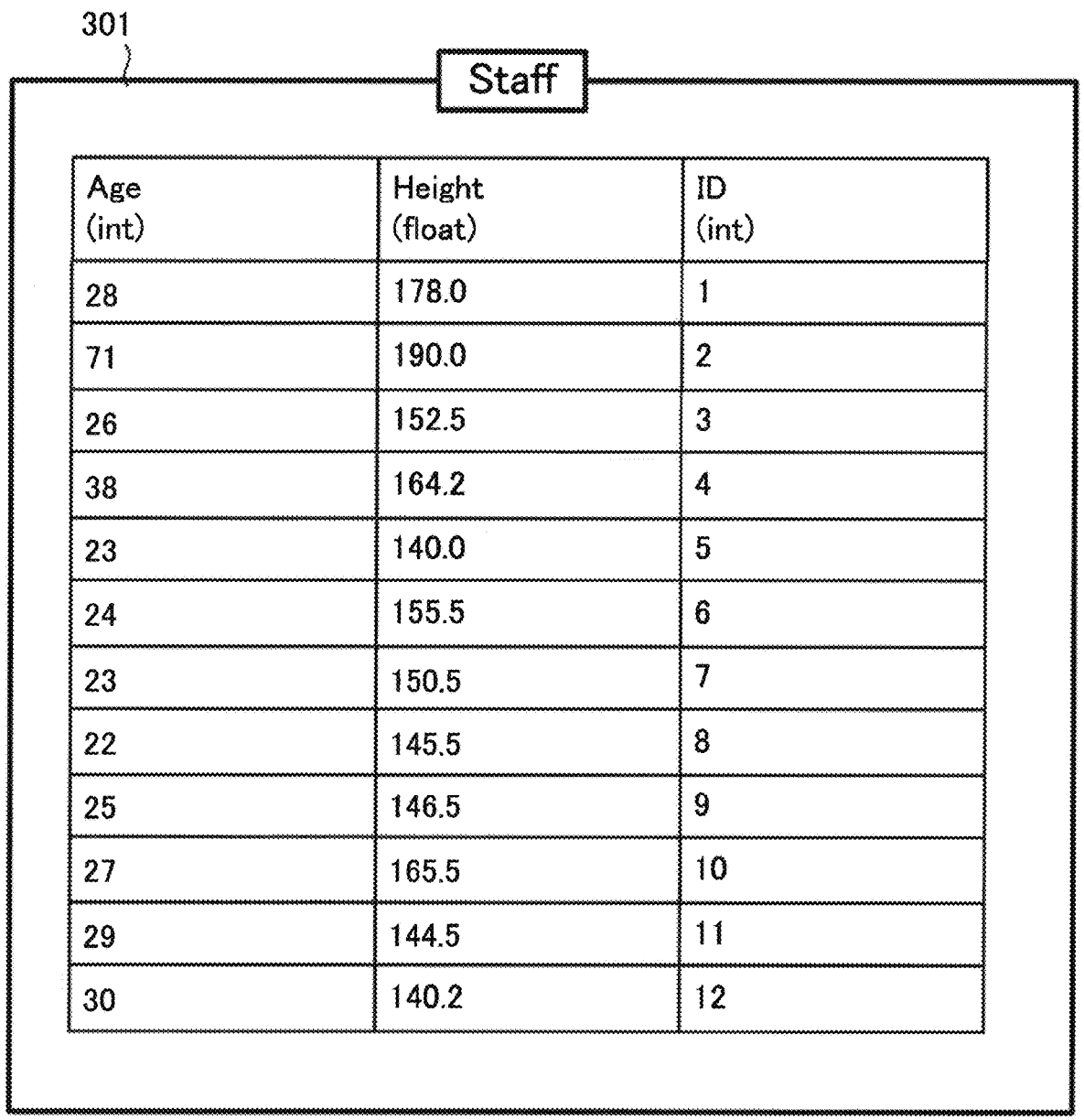
FIG. 3 is a diagram illustrating an example of table data.

FIG. 3 illustrates, as an example of table data, table data 301 in which attributes of employees are aggregated. The table data 301 illustrated in FIG. 3 records age (Age) and height (Height), herein, as an example of the attributes of the employees. IDs in FIG. 3 are identifiers of the employees. In addition, "int" in FIG. 3 indicates integer type data. Similarly, "float" in FIG. 3 indicates floating point type data.

There are various ways in which the table data input unit 201 acquires table data (table). For example, the table data input unit 201 may acquire target rows and columns input from an external device as the table data. Besides, for example, the table data input unit 201 may acquire the table data input manually by a user. Further, the table data input unit 201 may access an external device and acquire the target rows and columns therefrom.

(File Creation Unit 202)

The file creation unit 202 creates a file of the table data in order to record the table data in a memory device such as a main memory or a secondary memory. The file includes a plurality of areas called blocks. Specifically, the file creation unit 202 functions as partition means that executes horizontal partitioning, which is partitioning using records as a unit, on the table data, and records each of the blocks into each of block areas in a file after partitioning the table into a plurality of blocks. When the file creation unit 202 sorts order of rows in a table before horizontally partitioning the table and then performs horizontal partitioning, it is possible to increase a probability that a statistical value is usable in a query.

Each of the blocks holds a statistical value (a maximum value, a minimum value or the like) of a group of records included in the block, the statistical value being computed based on the statistical value information calculation unit 203. The statistical value is called "lightweight index". In addition, each of the blocks holds, for each attribute, distribution information which approximates, by using a bit string, data distribution of a group of records included in the block, the distribution information being computed based on the distribution information calculation unit 204.

Figure 4:
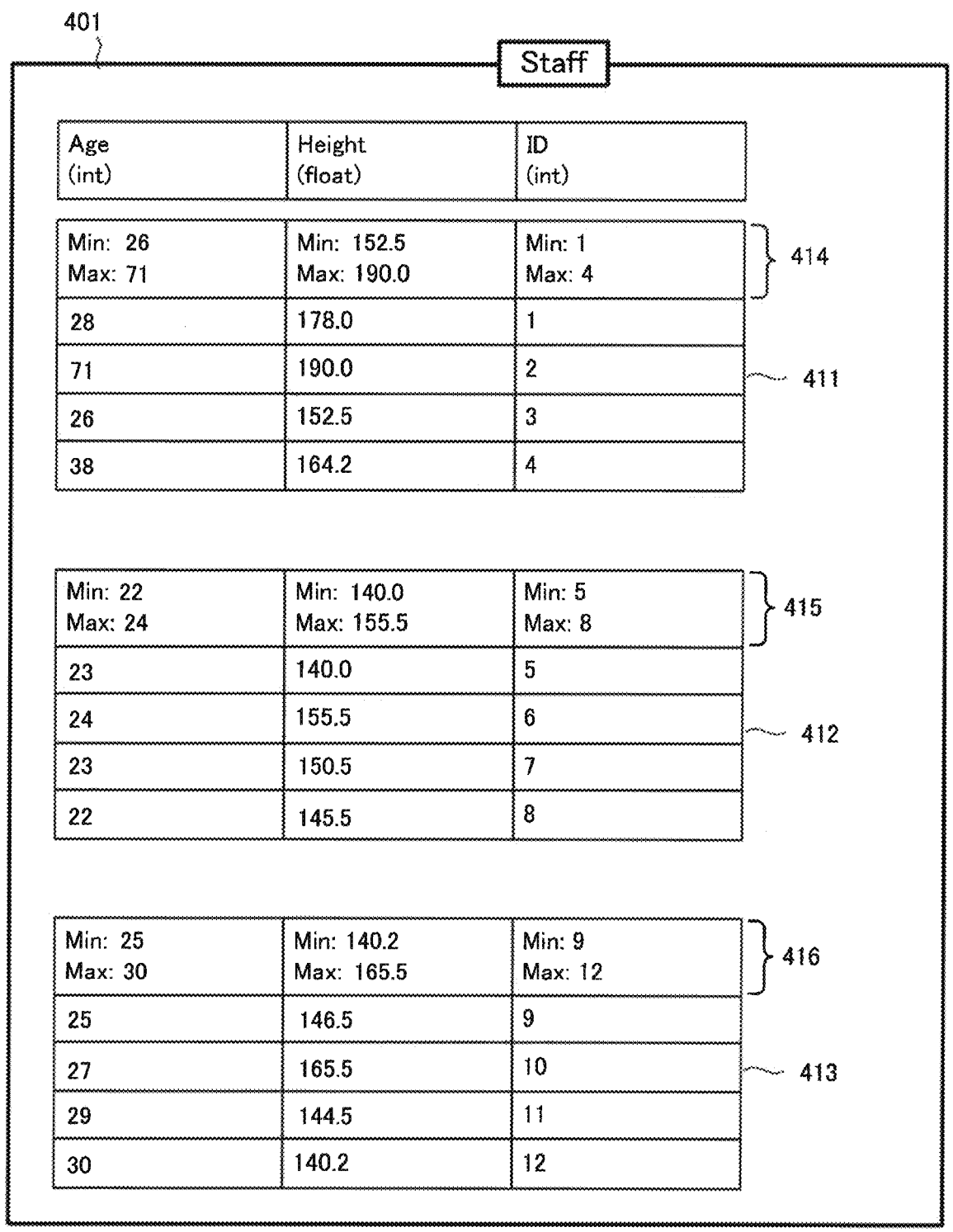
FIG. 4 is a diagram illustrating an example of table data partitioned into blocks.

FIG. 4 illustrates table data 401 which is in a state applied processing of file creation to the table data 301 illustrated in FIG. 3 by the file creation unit 202. In the table data 401, blocks 411 to 413 are generated based on horizontal partitioning. The blocks 411 to 413 respectively hold statistical values (herein, a minimum value and a maximum value) of a group of records included in the block as lightweight indexes 414 to 416, the statistical values being computed based on the statistical value information calculation unit 203.

(Statistical Value Information Calculation Unit 203)

The statistical value information calculation unit 203 calculates, for each attribute, a statistical value of a group of records included in a block. Example of the statistical value include a maximum value, a minimum value, or an average value of an attribute, or a number of records included in the block.

(Distribution Information Calculation Unit 204)

The distribution information calculation unit 204 calculates, for each attribute, distribution information which approximates, by using a bit string, data distribution of a group of records in a block. The distribution information is a fixed-length bit string. The distribution information for a certain attribute is calculated by inputting an attribute value of each of records in a block to a mapping function which receives an attribute value and returns a bit position, and setting bit 1 to the bit position obtained as an output from the mapping function. Examples of the mapping functions include a function "f(x)" which quantizes a value by using modulo operation, as in Equation (1). In Equation (1), x is an attribute value. In addition, N corresponds to a bit length of a bit string representing distribution information. Note that the second term of Equation (1) uses a Gauss symbol indicating a floor function and a "mod" symbol (modular symbol) indicating a remainder in division.

[Equation 1]

$$f(x) = 1 + \left\lfloor \frac{x-1}{4} \right\rfloor \bmod N \quad (1)$$

Figure 5:
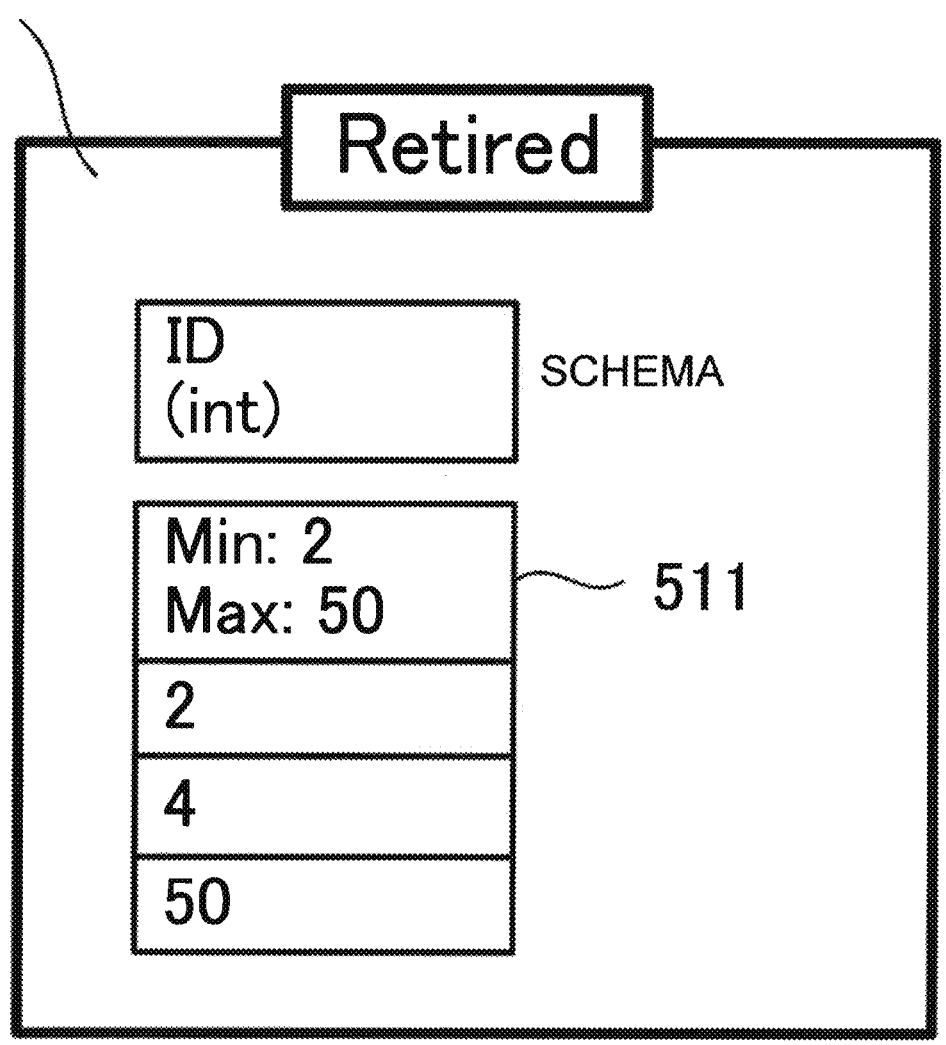
FIG. 5 is a diagram illustrating an example of retired table data.

As a specific example, calculation of distribution information for attribute IDs in a block 511 of a Retired table 501 in FIG. 5 is assumed. Herein, a bit number N is assumed to be "8". IDs in Block A are 2, 4, and 50. Since inputting 2, 4, and 50 to the above-described function f(x) gives f(2)=1, f(4)=1, and f(50)=5, the distribution information calculation unit 204 calculates "10001000", in which "1" is set to the first bit and the fifth bit in a bit string of distribution information.

Note that in the present example embodiment, distribution information is stored in a file. However, other modes of the storage include, as will be described in a second example embodiment, preparing a database including distribution information separately from a file.

(Query Reception Unit 205)

The query reception unit 205 acquires a description of processing on table data (table) stored in the file storage unit 208, in other words, acquires a query. Examples of programming languages used in the query include the SQL or a Hive Query Language (refer to NPL 1).

Figure 6:
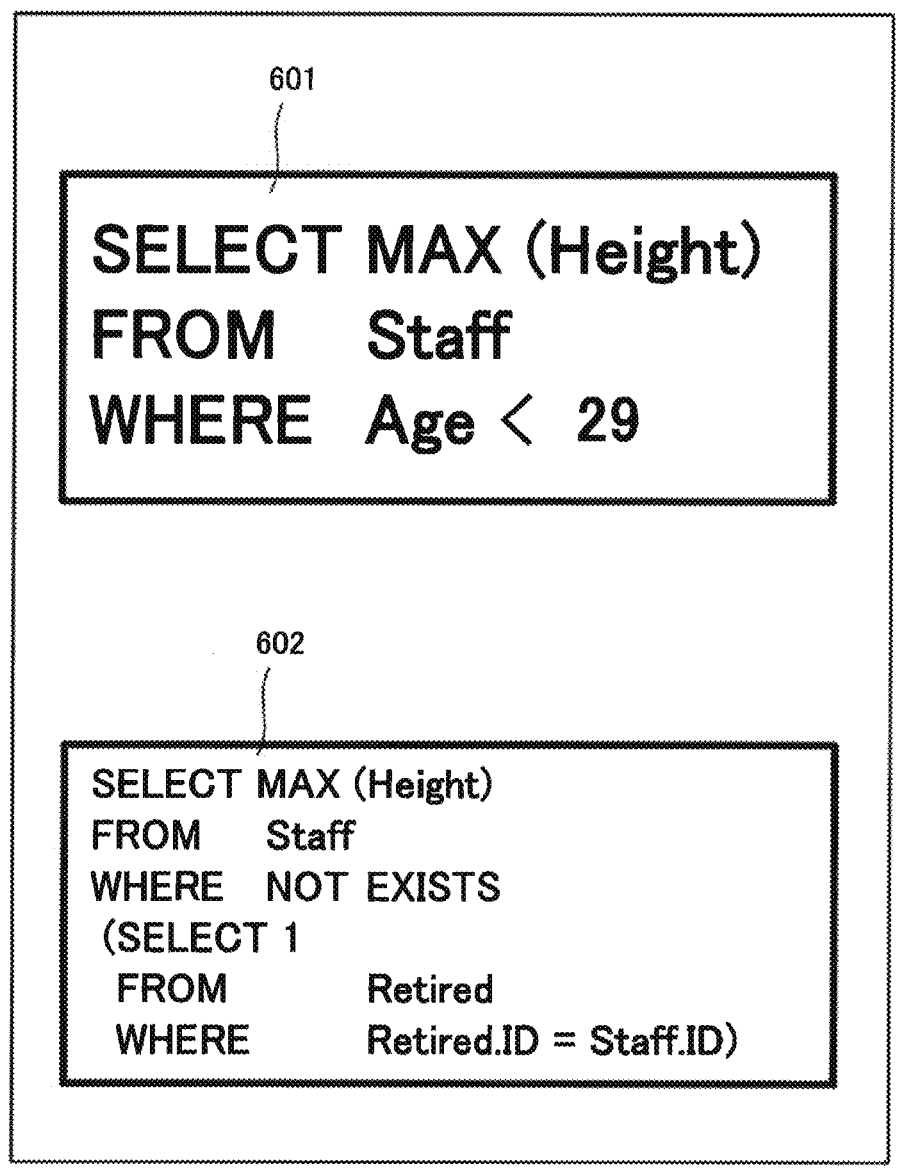
FIG. 6 is a diagram illustrating an example of a query.

FIG. 6 is a diagram illustrating a query 601 for finding a maximum height among employees with age less than 29 years old and a query 602 for finding a maximum height among existing employees (employees not included in retired employees).

(Query Execution Unit 206)

The query execution unit 206 executes the query acquired by the query reception unit 205. Specifically, the query execution unit 206 transforms the query into an execution plan configured as a graph for basic operation. The query execution unit 206 then optimizes the execution plan to be an execution plan which obtains the same result of processing but can be executed faster. Subsequently, the query execution unit 206 performs processing in accordance with the optimized execution plan. Examples of the basic operations include processing of selection, join or projection used in a relational database, or processing of calculating a maximum value, a minimum value, an average value or a standard deviation of an attribute value in a record set.

Figure 7:
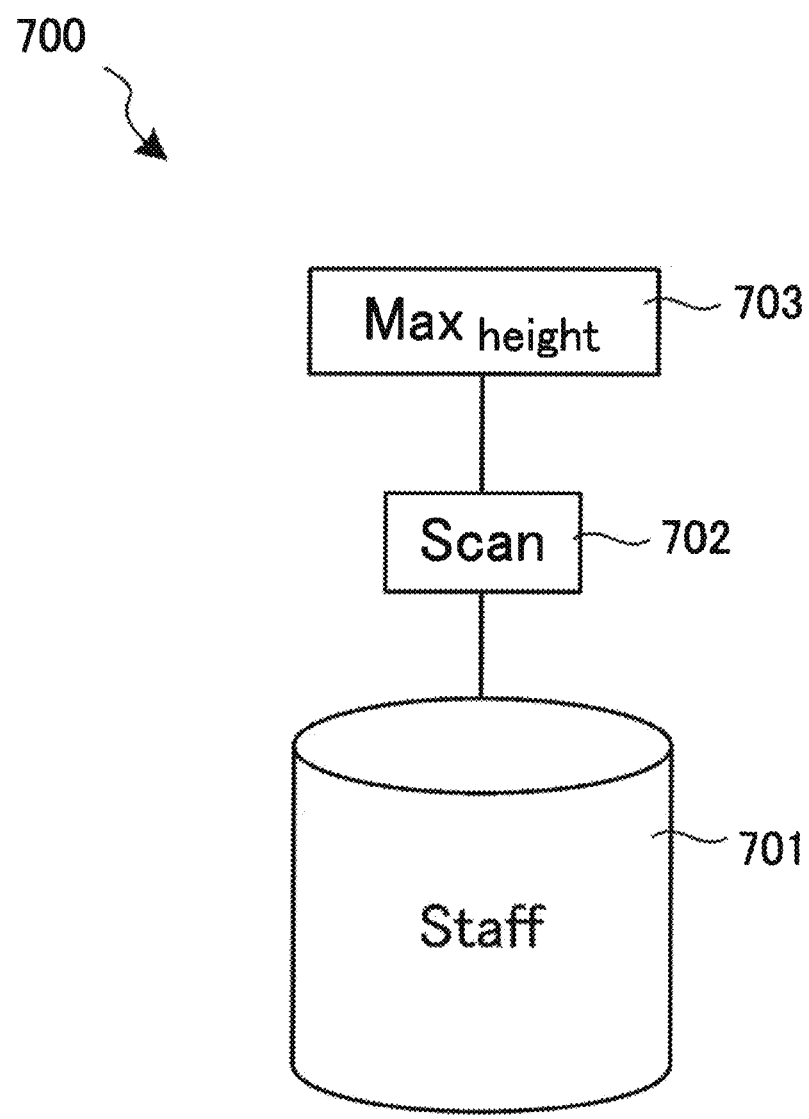
FIG. 7 is a diagram illustrating an example of an execution plan according to a query.
Figure 9:
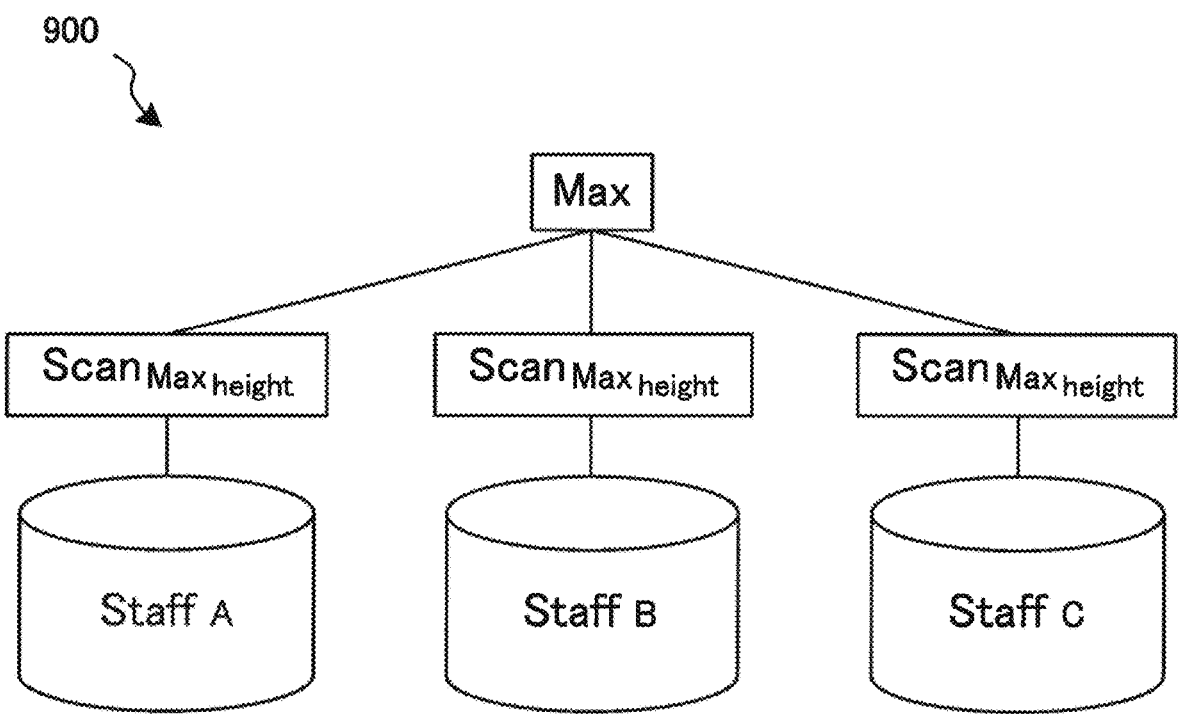
FIG. 9 is a diagram illustrating an execution plan obtained by transforming the execution plan illustrated in FIG. 7 so as to use a statistical value in a lightweight index.

FIG. 7 illustrates an example of the execution plan obtained from the query 601 for finding a maximum height among employees in the table data 301. In FIG. 7, a Staff 701 represents a Staff table, a Scan 702 represents scan processing on a table, and a "$Max_{height}$" 703 represents processing of finding a maximum value of a "height" attribute. The query execution unit 206 optimizes the execution plan in FIG. 7 to be an execution plan (FIG. 9) which uses statistical value information through steps as follows.

Figure 8:
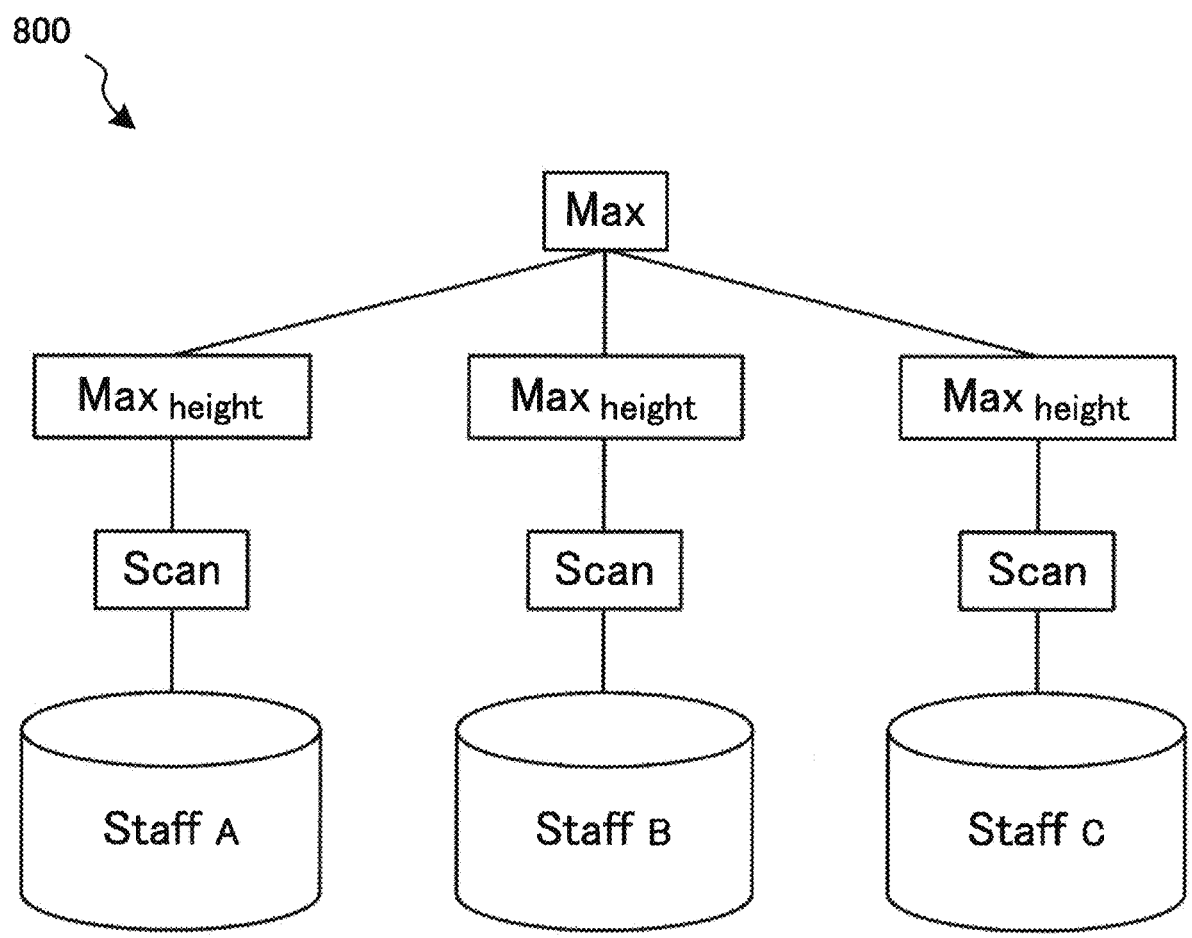
FIG. 8 is a diagram illustrating an execution plan obtained by transforming the execution plan illustrated in FIG. 7 so as to perform scan processing for each block.

First, from the fact that the Staff is horizontally partitioned into a plurality of blocks, the query execution unit 206 transforms an execution plan 700 in FIG. 7 into an execution plan 800 in FIG. 8. In FIG. 8, Staff A, Staff B, and Staff C respectively represent Blocks A, B, and C of the Staff, and Max represents processing for calculating a maximum value. In addition, "$Max_{height}$" represents a maximum value of height as statistical value information in a header of each of the blocks. Then, by using the fact that the maximum value of height ($Max_{height}$) is stored as the statistical value information in the header of each of the blocks of the execution plan 800 in FIG. 8, the query execution unit 206 transforms the execution plan 800 in FIG. 8 into an execution plan 900 in FIG. 9. In the execution plan 900, "$Scan_{Maxheight}$" represents processing of scanning a header of each of the blocks and finding a maximum value of height. The optimized execution plan 900 illustrated in FIG. 9 executes scanning of the header of each of the blocks. Thus, the execution plan 900 makes processing faster with less computation amount and less I/O amount than the execution plan 700 in FIG. 7 which requires scanning for all blocks.

Figure 10:
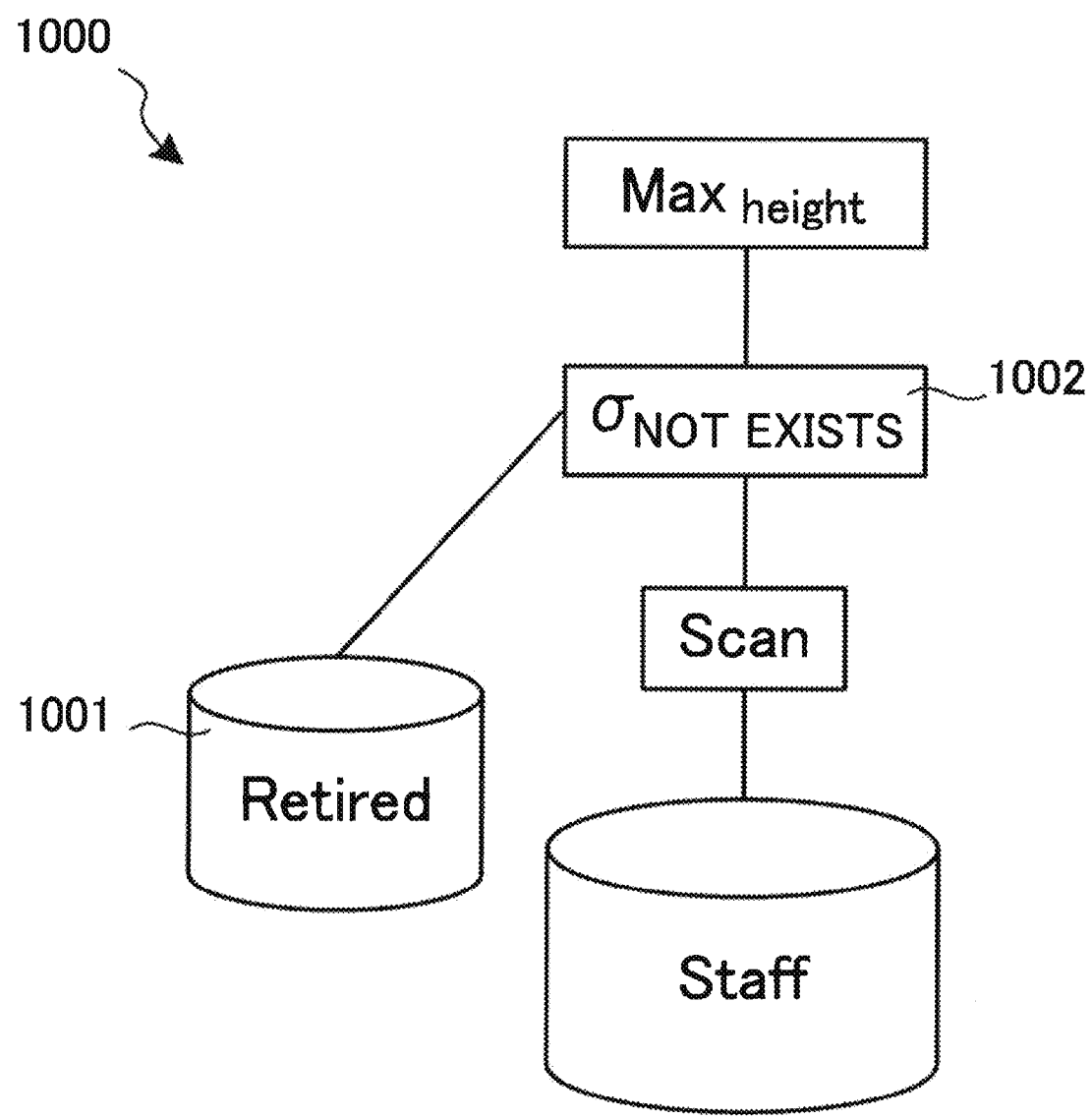
FIG. 10 is a diagram illustrating an example of an execution plan according to the query illustrated in FIG. 6.
Figure 11:
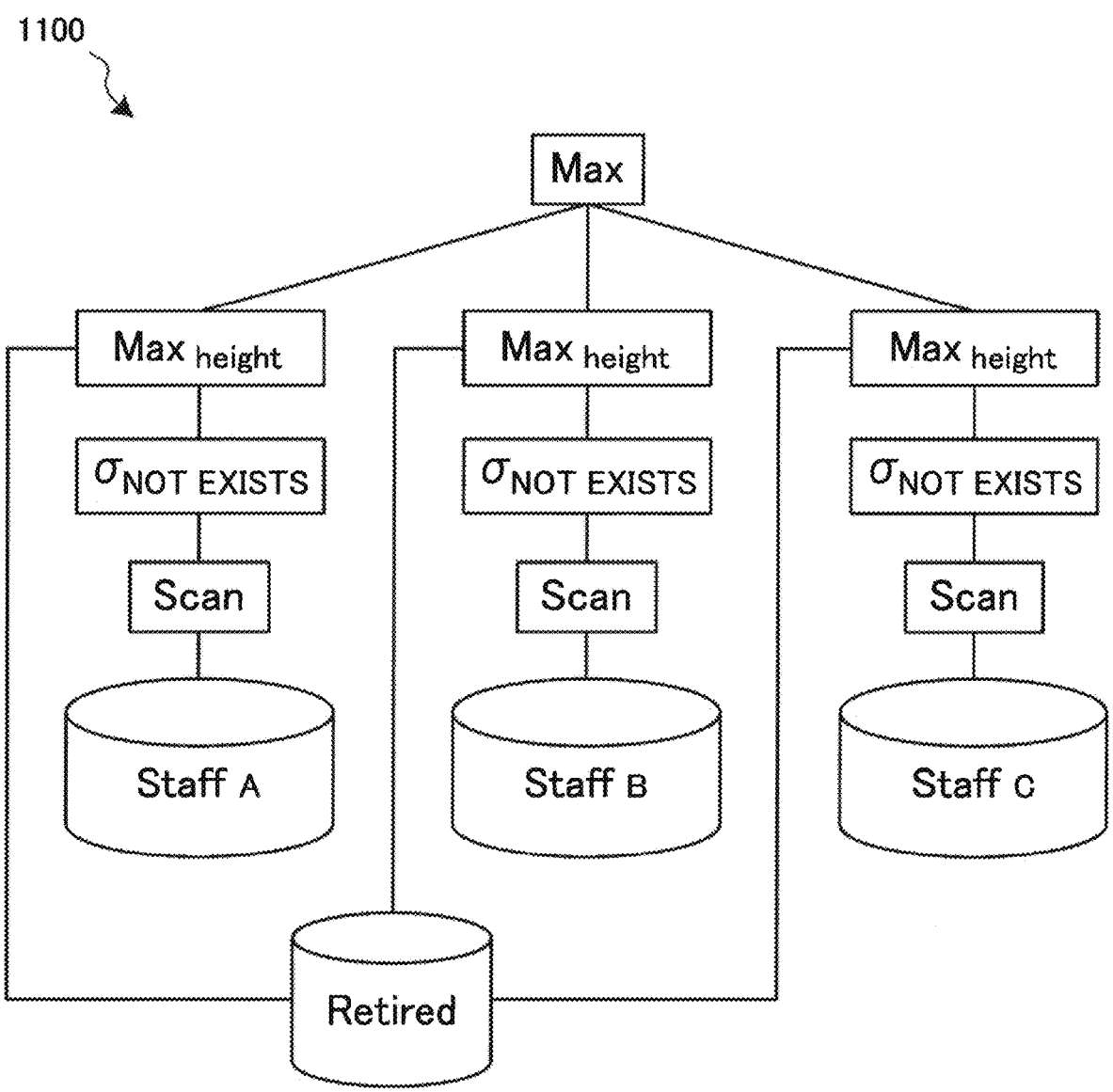
FIG. 11 is a diagram illustrating an execution plan obtained by transforming the execution plan illustrated in FIG. 10 so as to perform scan processing for each block.
Figure 12:
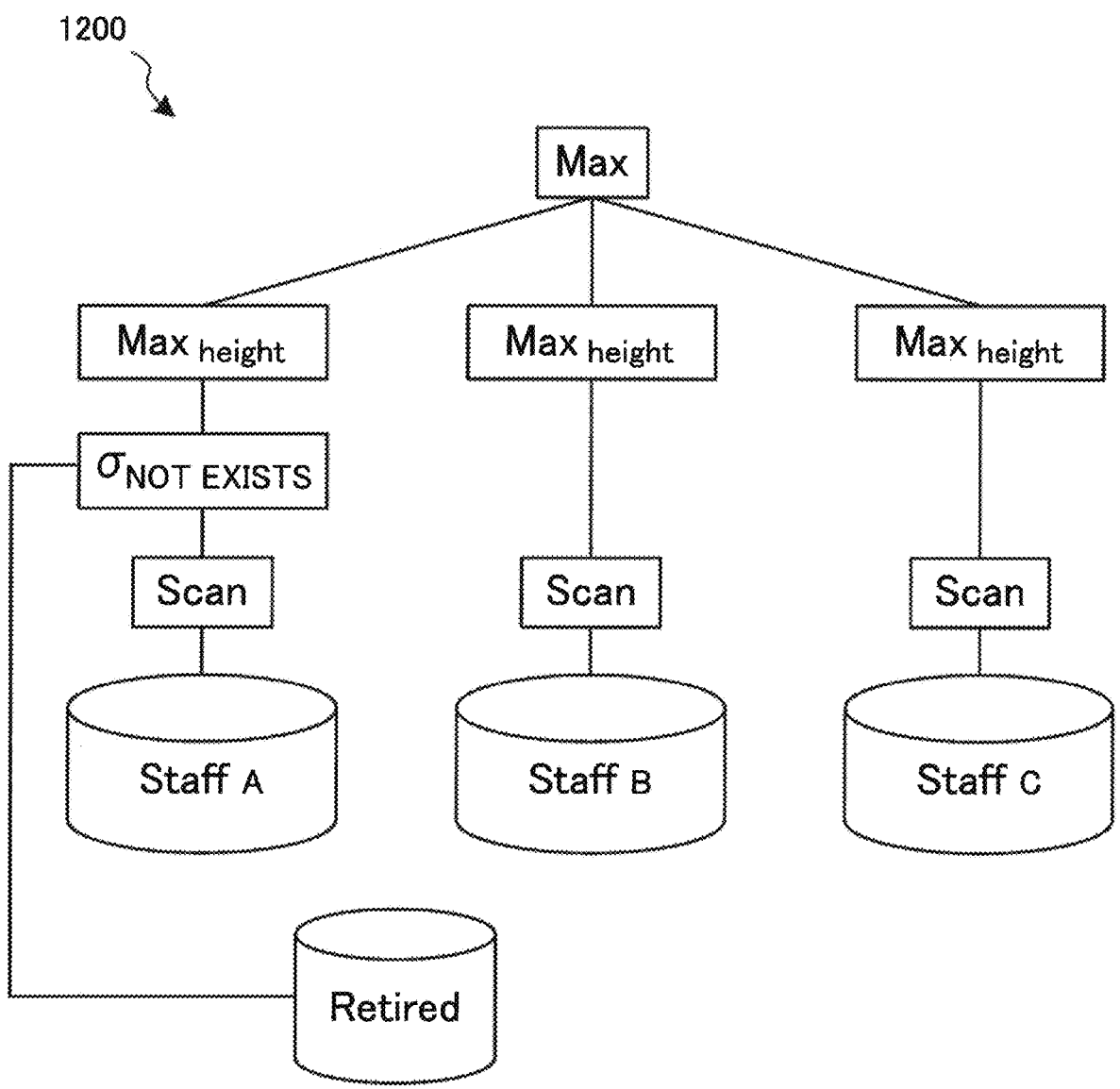
FIG. 12 is a diagram illustrating an execution plan obtained from the execution plan illustrated in FIG. 11 from which selection processing is removed with respect to a block in which all records are selected.
Figure 13:
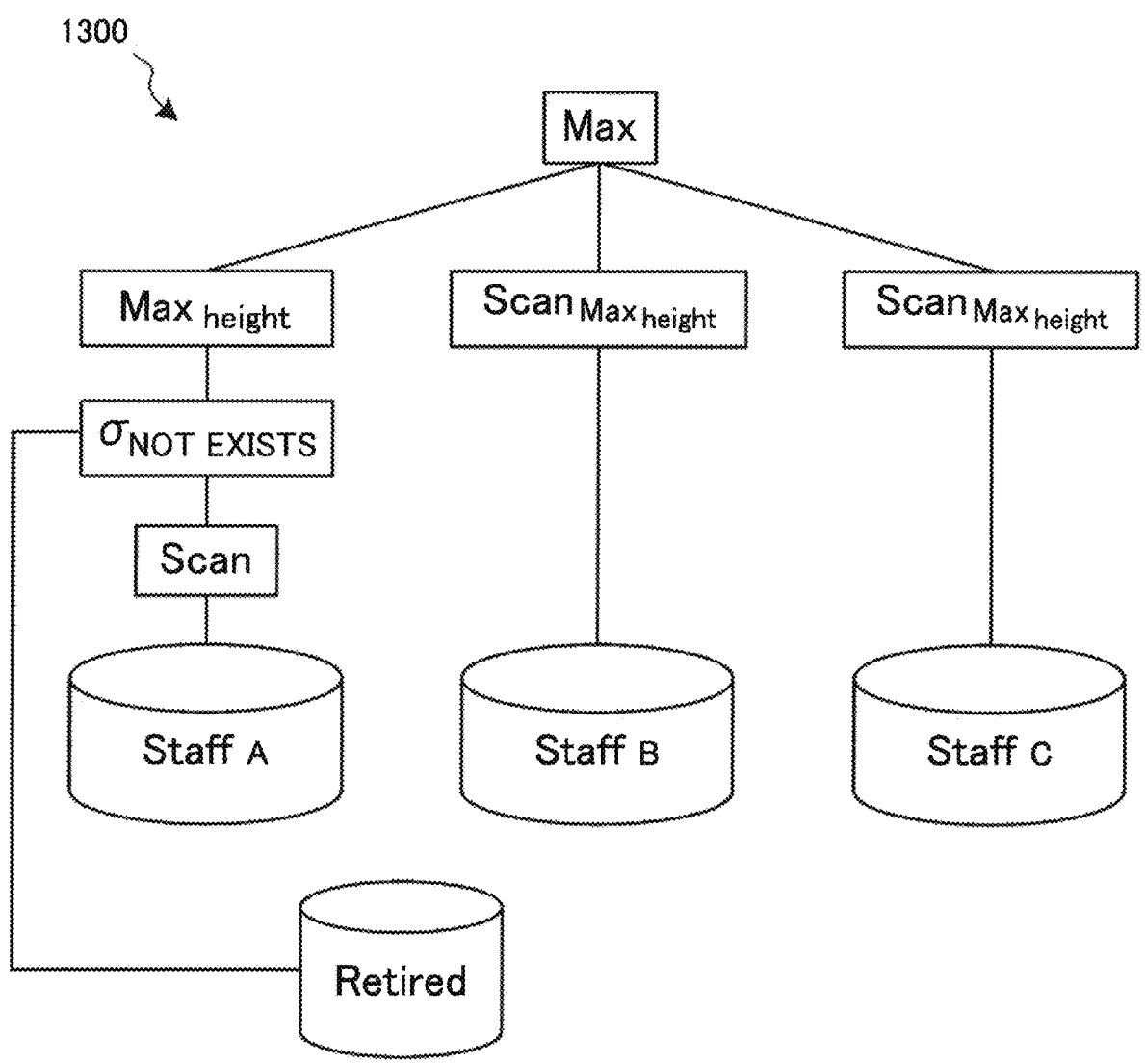
FIG. 13 is a diagram illustrating an execution plan obtained by transforming the execution plan illustrated in FIG. 12 so as to use a statistical value with respect to a block in which all records are selected.

FIG. 10 illustrates an example of an execution plan 1000 obtained from a query for finding a maximum height among existing employees in the Staff table exemplified in FIG. 4. In FIG. 10, a Retired 1001 represents a Retired table in which IDs of retired employees are stored, and a "$\sigma_{NOT\ EXISTS}$" 1002 represents selection processing based on NOT EXISTS (IDs not included in IDs of retired employees) respectively. The query execution unit 206 optimizes the execution plan 1000 in FIG. 10 to be an execution plan (FIG. 13) which uses statistical value information through steps as follows. First, from the fact that the Staff is horizontally partitioned into a plurality of blocks, the query execution unit 206 transforms the execution plan 1000 in FIG. 10 into an execution plan 1100 in FIG. 11. Then, the query execution unit 206 inputs the execution plan 1100 into the statistical value usability determination unit 207. Then, the statistical value usability determination unit 207 determines whether all records in each of the blocks are selected or not based on "$\sigma_{NOT\ EXISTS}$". When it is determined that all records are selected, the query execution unit 206 then removes the selection processing. For example, when it is determined that all records in Blocks B and C are selected, the query execution unit 206 transforms the execution plan 1100 in FIG. 11 into an execution plan 1200 in FIG. 12. Thereafter, the query execution unit 206 substitutes block scan processing and maximum value calculation processing on B and C with statistical value scan processing in the same manner as in the aforementioned example, and finally obtains an execution plan 1300 in FIG. 13.

(Statistical Value Usability Determination Unit 207)

The statistical value usability determination unit 207 determines whether a statistical value is usable or not in an execution plan. For example, when selection processing is present between block scan processing and aggregation processing, the statistical value usability determination unit 207 determines whether all records in a block are selected or not in the selection processing without referencing the records stored in the block.

Examples of methods for the determination as to whether all records are selected include a false-negative determination scheme using distribution information. The word "false-negative" indicates making determination that an unselected record is present despite the fact that all records are actually selected. When making determination that an unselected record is present, no optimization is performed with respect to the unselected record, which accordingly results in a loss of opportunity for optimization. However, processing without optimization does not affect a result of the processing. Thus, the determination in this manner is a safe method.

When processing the query 601 in FIG. 6, since a selection condition for record selection processing is based on magnitude relation of an attribute, the statistical value usability determination unit 207 uses a maximum value and a minimum value of an attribute stored in a header of a block. The statistical value usability determination unit 207 then determines whether all records in the block are selected or not, in other words, whether a statistical value is usable or not.

On the other hand, when processing the query 602 illustrated in FIG. 6, the statistical value usability determination unit 207 uses the distribution information calculated based on the mapping function illustrated in Equation (1). In other words, the statistical value usability determination unit 207 determines, by using distribution information, whether all records are selected or not in selection processing based on NOT EXISTS appearing in the query 602. A task (determination) herein is to make determination as to whether or not none of the records with the IDs in the Retired table is included in each of the blocks of the Staff table. When none of the records is included, the statistical value usability determination unit 207 can recognize that all records in the block are selected based on selection processing.

As described above, the distribution information calculation unit 204 obtains the bit string "10001000" as the distribution information for the ID attribute in the Retired table. In addition, by using the mapping function in the same manner, the distribution information calculation unit 204 obtains bit strings "10000000", "01000000", and "00100000" as distribution information respectively for Blocks A, B, and C in the Staff table. At this time, the statistical value usability determination unit 207 performs AND operation on the bit string of the Retired table and the bit string of each of the blocks. When a result of the operation becomes "0", the statistical value usability determination unit 207 determines that none of the records with the IDs in the Retired table is included in the block of the Staff table. In other words, the statistical value usability determination unit 207 determines that all records in the block are selected based on selection processing. Herein, as for Block A, the AND operation results in a value being not "0", and as for Blocks B and C, the AND operation results in "0". Accordingly, the statistical value usability determination unit 207 determines, as for Blocks B and C, that all records are selected in selection processing based on NOT EXISTS. Based on the above processing, the query execution unit 206 optimizes an execution plan so that processing is performed by using a statistical value with respect to these blocks (Blocks B and C), and shortens a computation time.

Figure 14:
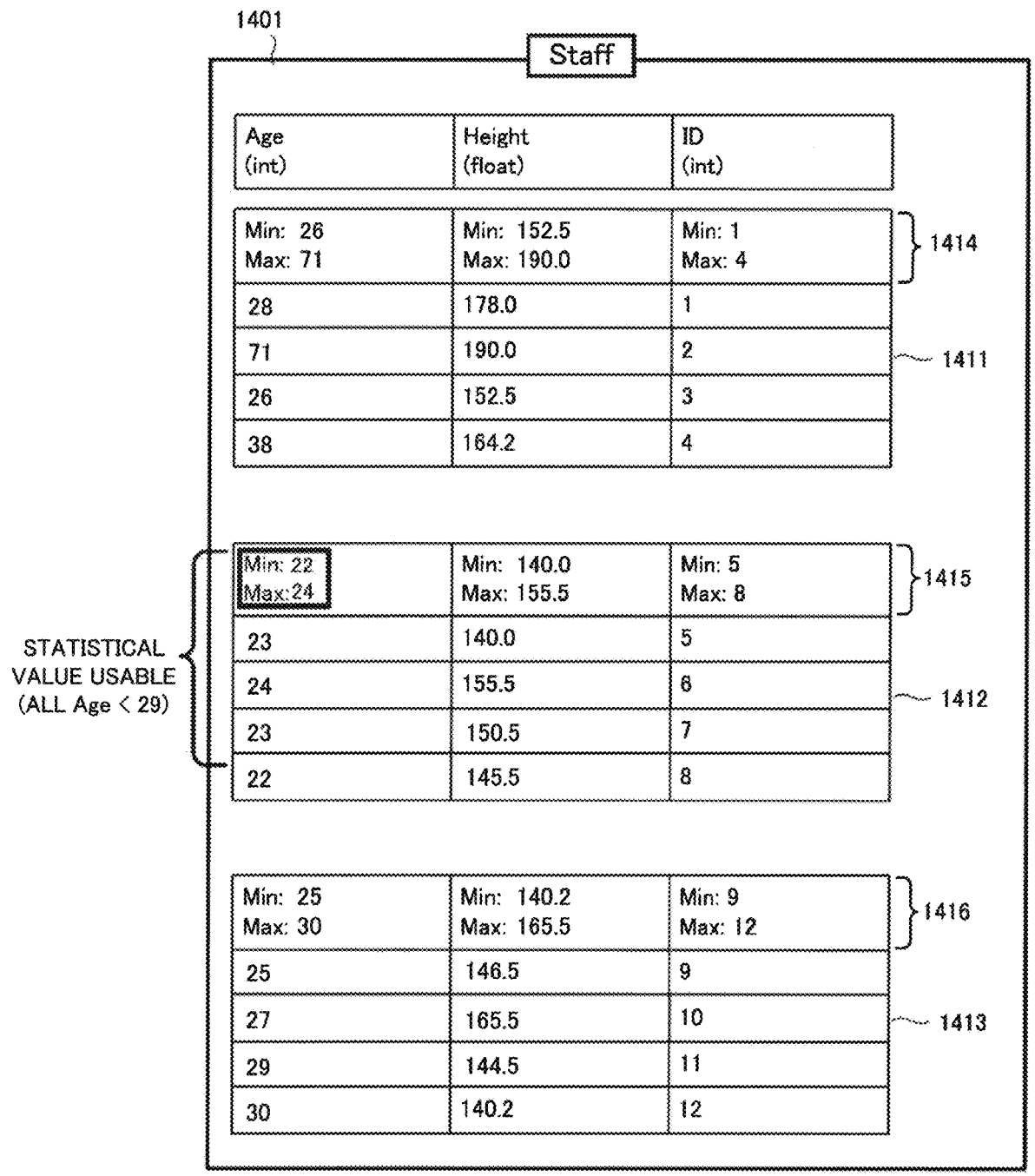
FIG. 14 is a diagram exemplifying a result of determination for table data whether a statistical value is usable or not in the query illustrated in FIG. 6.

For example, the statistical value usability determination unit 207 scans, for the query 601, a header in each of blocks 1411 to 1413 of table data 1401 exemplified in FIG. 14, and acquires a maximum value and a minimum value of Age attribute in the block. Note that, in this case, the statistical value usability determination unit 207 uses lightweight indexes 1414 to 1416 of the blocks 1411 to 1413. Since a selection condition is "Age<29", the statistical value usability determination unit 207 determines, as for a block whose maximum value of Age is less than 29, that all records are selected, in other words, determines that a statistical value is usable. In FIG. 14, the block 1412 pertains to the determination.

Figure 15:
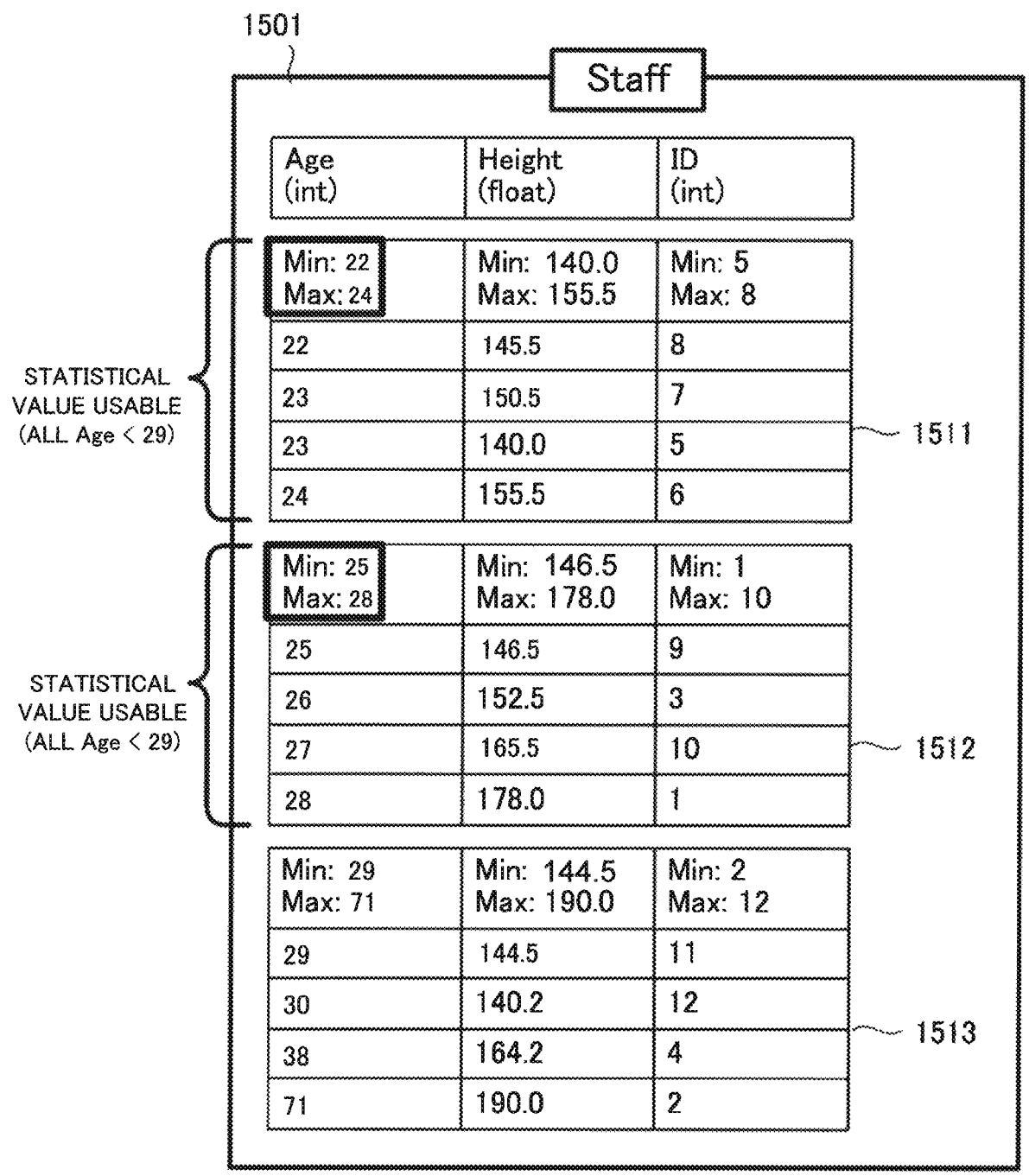
FIG. 15 is a diagram illustrating a result of determination whether a statistical value is usable or not after sorting the table data illustrated in FIG. 3 by an attribute "Age"

Note that the file creation unit 202 may sort order of records before horizontally partitioning a table, as described above. Specifically, the file creation unit 202 may sort records (rows) of table data by an attribute which frequently appears in a conditional expression of selection processing in a past query, and, subsequently, may horizontally partition the table data and create blocks. Based on the sorting, the file creation unit 202 is able to reduce dispersion of attribute values in a block and increase a probability that a statistical value is usable in a query. FIG. 15 is a diagram illustrating table data 1501 obtained by sorting the table data 1401 in FIG. 14 by an attribute "Age". In the table data 1501 in FIG. 15, blocks whose statistical values are usable are two blocks 1511 and 1512 out of three blocks 1511 to 1513. A number of blocks whose statistical amounts are usable has more one than a number of blocks in the pre-sorting table data 1401. In other words, since the number of blocks for which scanning can be omitted is increased, in the table data 1501, I/O amount and less computation amount are decreased. Thus, query processing is performed more efficiently.

An attribute by which sorting is performed may be determined by a user, or may be automatically determined by the data processing device 200. Examples of methods for the determination of sorting attributes include a method in which an attribute frequently appearing in a conditional expression of selection processing is selected from a history of past queries. In general, a query similar to a query performed in the past is highly likely to be performed in the future. Thus, the method is expected to improve a performance of a query to be performed in the future.

(File Storage Unit 208)

The file storage unit 208 stores the file created based on the file creation unit 202 in a recording medium. The recording medium may be a main memory and a secondary memory.

(Flow of Processing)

Figure 16:
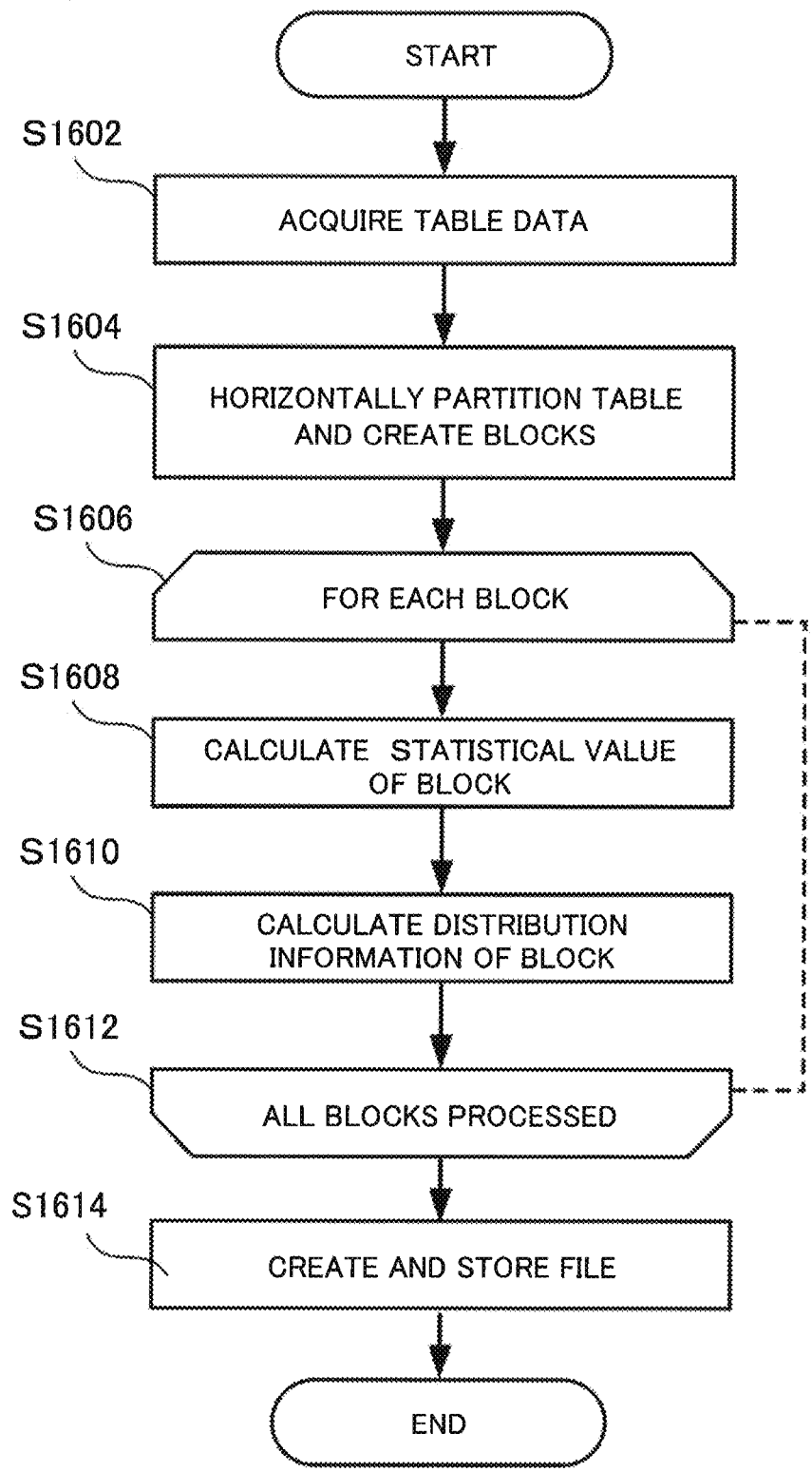
FIG. 16 is a flowchart exemplifying a flow of processing executed when table data is input to the data processing device according to the second example embodiment.

FIG. 16 is a flowchart exemplifying a flow of processing executed when table data is input to the data processing device 200. At Step S1602, the table data input unit 201 acquires table data. At Step S1604, the file creation unit 202 horizontally partitions a table and creates blocks. Through Steps S1606 to S1612, the statistical value information calculation unit 203 calculates a statistical value for each of the blocks (S1608). Further, the distribution information calculation unit 204 calculates distribution information for each of the blocks (S1610). Thereafter, the file creation unit 202 creates a file based on the blocks and the obtained statistical value information and the obtained distribution information, and stores the file in the file storage unit 208 (S1614).

Figure 17:
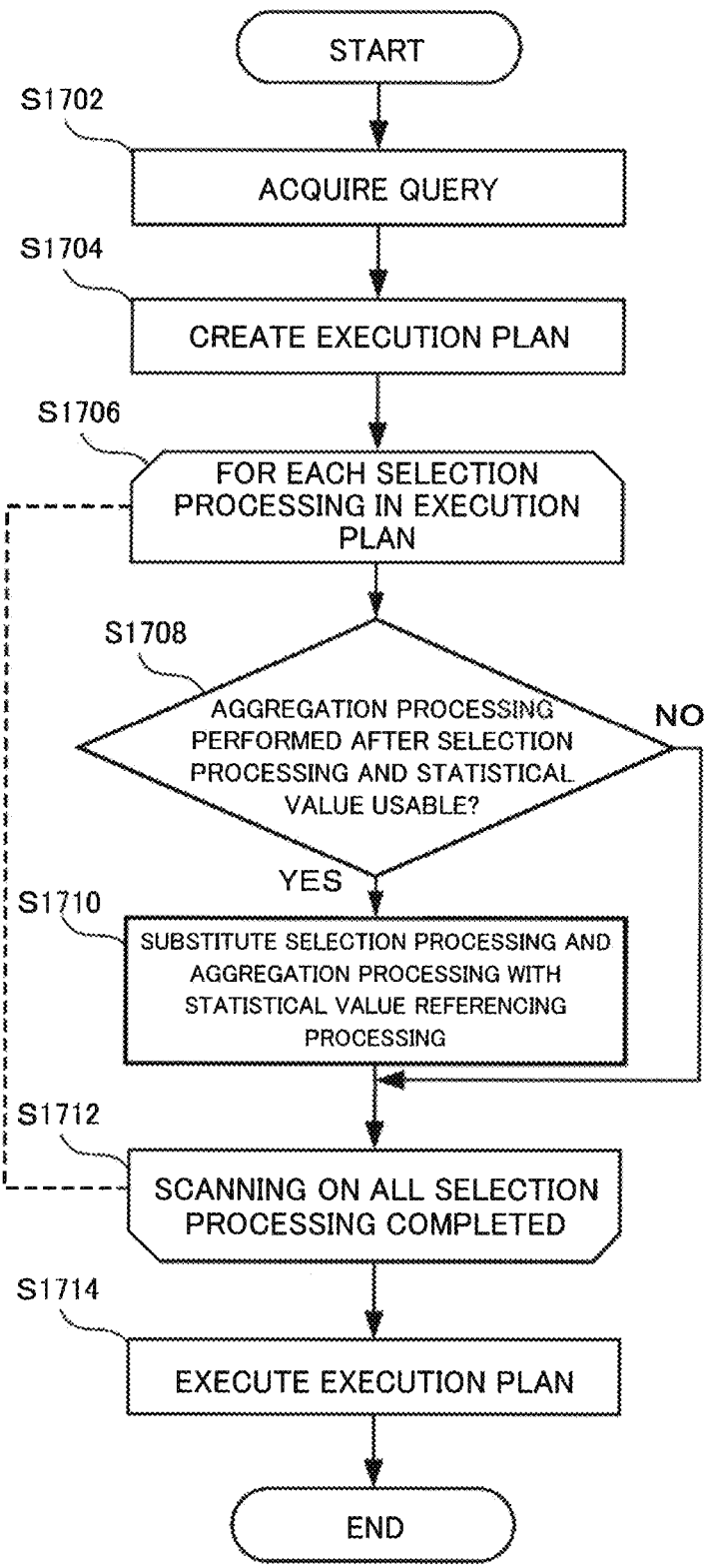
FIG. 17 is a flowchart exemplifying a flow of processing during execution of a query in the data processing device according to the second example embodiment.

FIG. 17 is a flowchart exemplifying a flow of processing during execution of a query in the data processing device 200. At Step S1702, the query reception unit 205 acquires a query. At Step S1704, the query execution unit 206 creates an execution plan. At Step S1706, when aggregation processing is performed immediately after record selection processing, the query execution unit 206 inquires the statistical value usability determination unit 207 for each record selection processing in the execution plan. The query execution unit 206 then determines whether a statistical value is usable or not for a processing result of the selection processing (S1708). Then, when determining that a statistical value is usable, the query execution unit 206 substitutes the selection processing and the subsequent aggregation processing with statistical value referencing processing (S1710). When the query execution unit 206 completes the optimization processing for the execution plan (the determination and the substitution for all record selection processing), the data processing device 200 proceeds from Step S1712 to Step S1714. At Step S1714, the query execution unit 206 processes the query in accordance with the optimized execution plan while referencing the table data stored in the file storage unit 208.

(Advantageous Effect)

In the present example embodiment, aggregation processing of a result of record selection processing included in an execution plan is substituted with scan processing of a statistical value in a lightweight index. Thus, the present example embodiment is capable of exhibiting an advantageous effect of reducing a computation amount and an I/O amount. As a result, the present example embodiment is capable of exhibiting an advantageous effect of shortening an execution time of aggregation processing.

The detailed reason is as follows. The table data input unit 201 acquires table data. The file creation unit 202 then horizontally partitions a table and creates blocks. The statistical value information calculation unit 203 calculates a statistical value for each of the blocks. Further, the distribution information calculation unit 204 calculates distribution information for each of the blocks. Thereafter, the file creation unit 202 creates a file including the blocks and the obtained statistical value information and the obtained distribution information, and saves the file.

The query execution unit 206 then creates an execution plan for a query acquired by the query reception unit 205. When aggregation processing is performed immediately after record selection processing, the query execution unit 206 then determines, by using the statistical value usability determination unit 207, whether the statistical value is usable or not for each record selection processing in the execution plan. When determining that the statistical value is usable, the query execution unit 206 substitutes, in other words, optimizes the selection processing and the subsequent aggregation processing with statistical value referencing processing. The query execution unit 206 then processes the query in accordance with the optimized execution plan.

Third Example Embodiment

Figure 18:
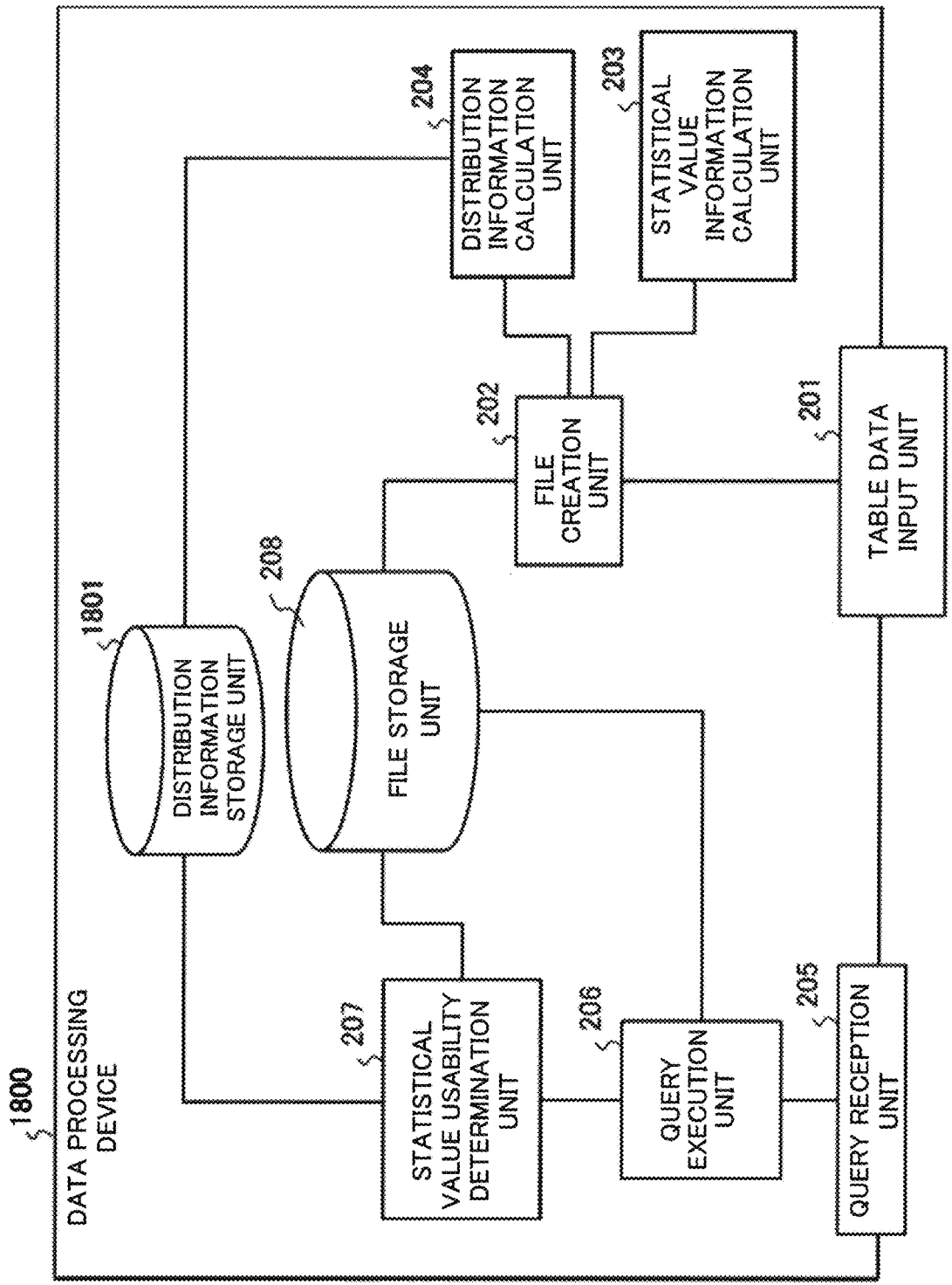
FIG. 18 is a block diagram exemplifying a data processing device according to a third example embodiment.
Figure 20:
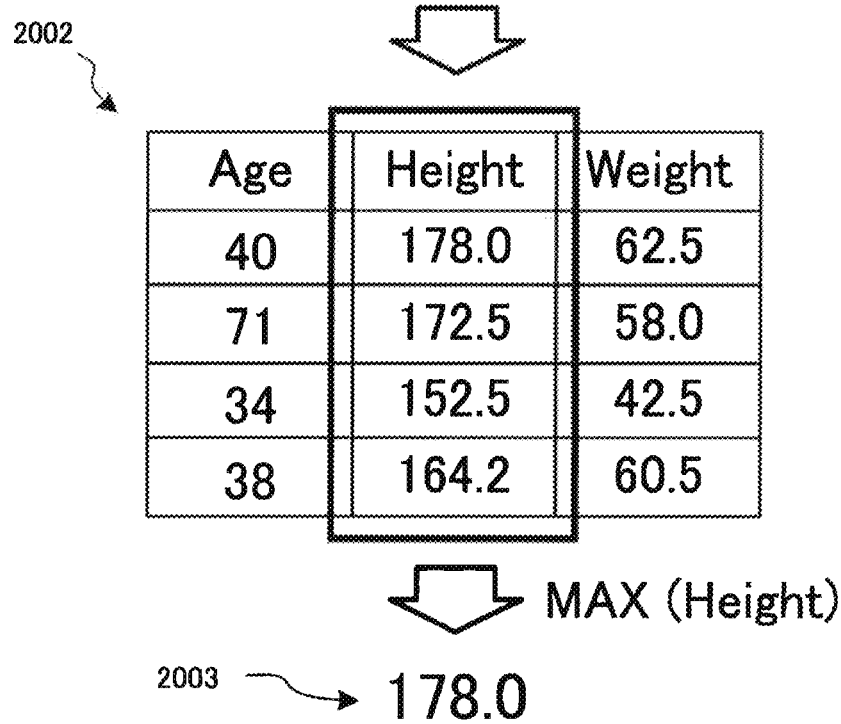
FIG. 20 is a diagram illustrating an image of processing the query in FIG. 19.
Figure 20:
Figure 20:
Figure 21:
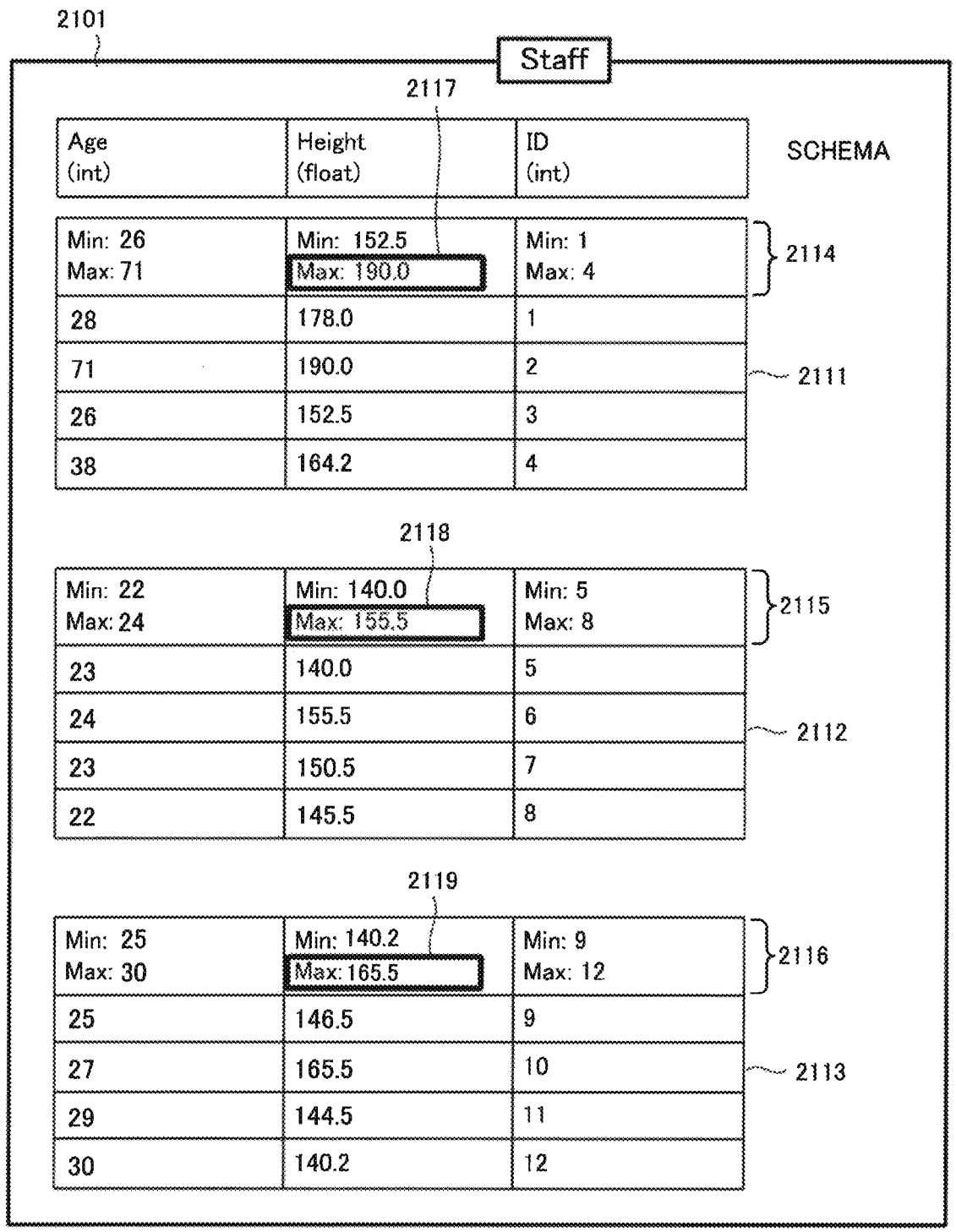
FIG. 21 is a diagram illustrating a storage form of a table in NPL 1.
Figure 23:
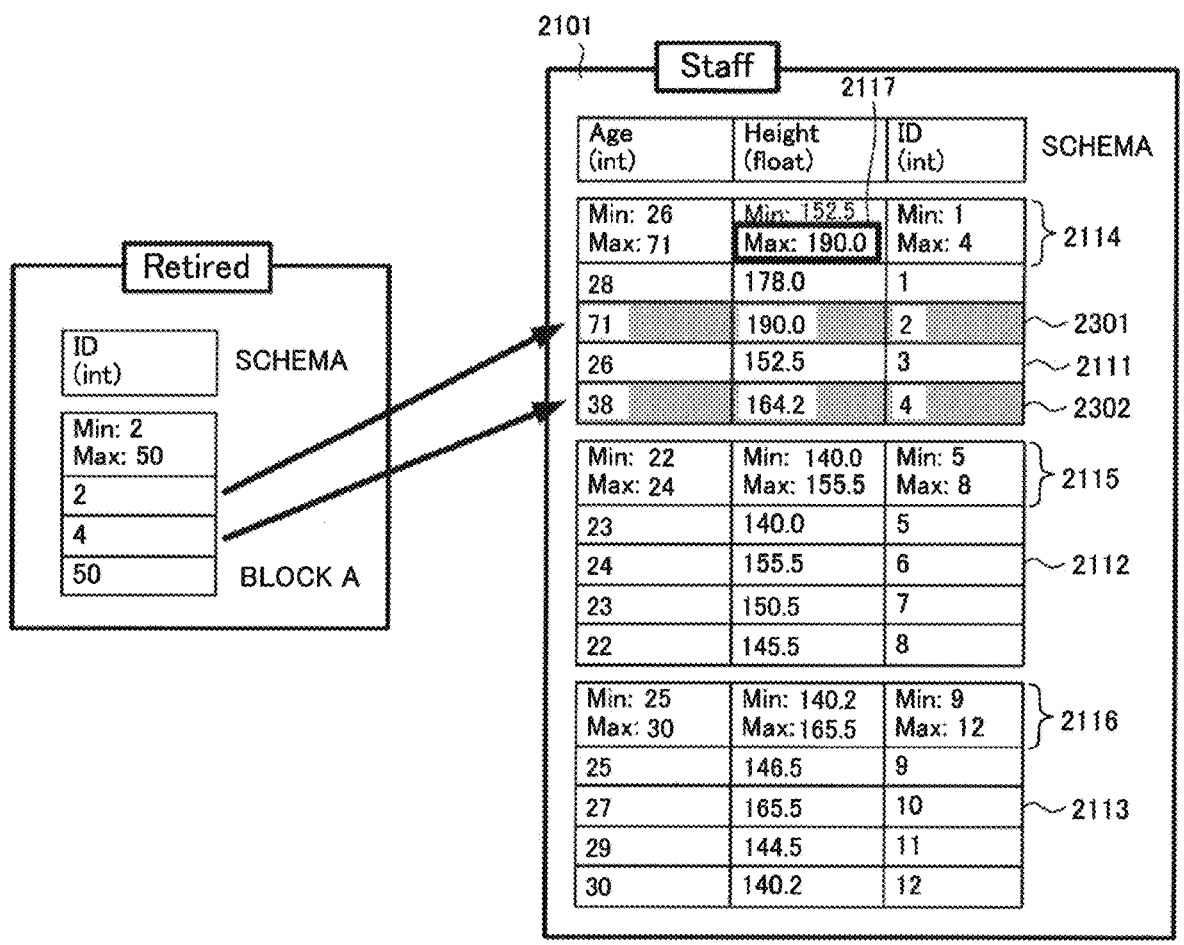
FIG. 23 is a diagram illustrating an image of processing the query illustrated in FIG. 22.

Next, a data processing device 1800 according to a third example embodiment of the present invention is described with use of FIG. 18. FIG. 18 is a diagram for illustrating a functional configuration of the data processing device 1800 according to the present example embodiment. The data processing device 1800 according to the present example embodiment is different in including a distribution information storage unit 1801 in comparison with the above-described second example embodiment. Other configurations and operations are the same as those in the second example embodiment. Thus, the same configurations and operations are assigned with the same reference numerals, and detailed description therefor is omitted.

Unlike the data processing device 200 that stores data distribution information in a header part of a block in a table data file, the data processing device 1800 stores data distribution information in the distribution information storage unit 1801. Thus, when determining usability of a statistical value, the statistical value usability determination unit 207 inquires the distribution information storage unit 1801 rather than a header of a block.

(Distribution Information Storage Unit 1801)

The distribution information storage unit 1801 stores the distribution information which is calculated by the distribution information calculation unit 204 for each of attributes in each block. The distribution information storage unit 1801 may be a database and a file in a main memory or a secondary memory.

(Advantageous Effect)

In the present example embodiment, a storage destination of the distribution information is separated from a storage destination of actual data. Thus, the present example embodiment is capable of exhibiting an advantageous effect of changing or adding a type of distribution information without updating a file in which table data is stored.

Other Example Embodiments

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. Furthermore, a system or a device variously combining separate features included in each of example embodiments falls within the scope of the present invention.

In addition, the present invention may be applied to a system configured by a plurality of equipment, or may be applied to a single device. Further, the present invention is also applicable in a case when an information processing program achieving the functions of the example embodiments are supplied directly or remotely to a system or a device. Accordingly, a data processing program installed on a computer in order to achieve the functions of the present invention by the computer, a medium storing the program, or a World Wide Web (WWW) server allowing the computer to download the program also fall within the scope of the present invention. In particular, at least a non-transitory computer readable medium that stores a program causing a computer to execute the processing steps included in the above-described example embodiments falls within the scope of the present invention.

[Hardware Configuration]

The data processing device 100, the data processing device 200, and the data processing device 1800 (hereinafter collectively referred to as the data processing device 100) described above are configured as follows.

For example, each of the components of the data processing device 100 may be configured by a hardware circuit.

In addition, each of the components of the data processing device 100 may be configured by using a plurality of devices connected via a network.

In addition, the plurality of components of the data processing device 100 may be configured by a single hardware component.

In addition, the data processing device 100 may be implemented as a computer device that includes a Central Processing Unit (CPU), a Read Only Memory (ROM), and a Random Access Memory (RAM). The data processing device 100 may be implemented as a computer device that further includes, in addition to the above-described configuration, an Input/Output Circuit (IOC) and a Network Interface Circuit (NIC).

Figure 24:
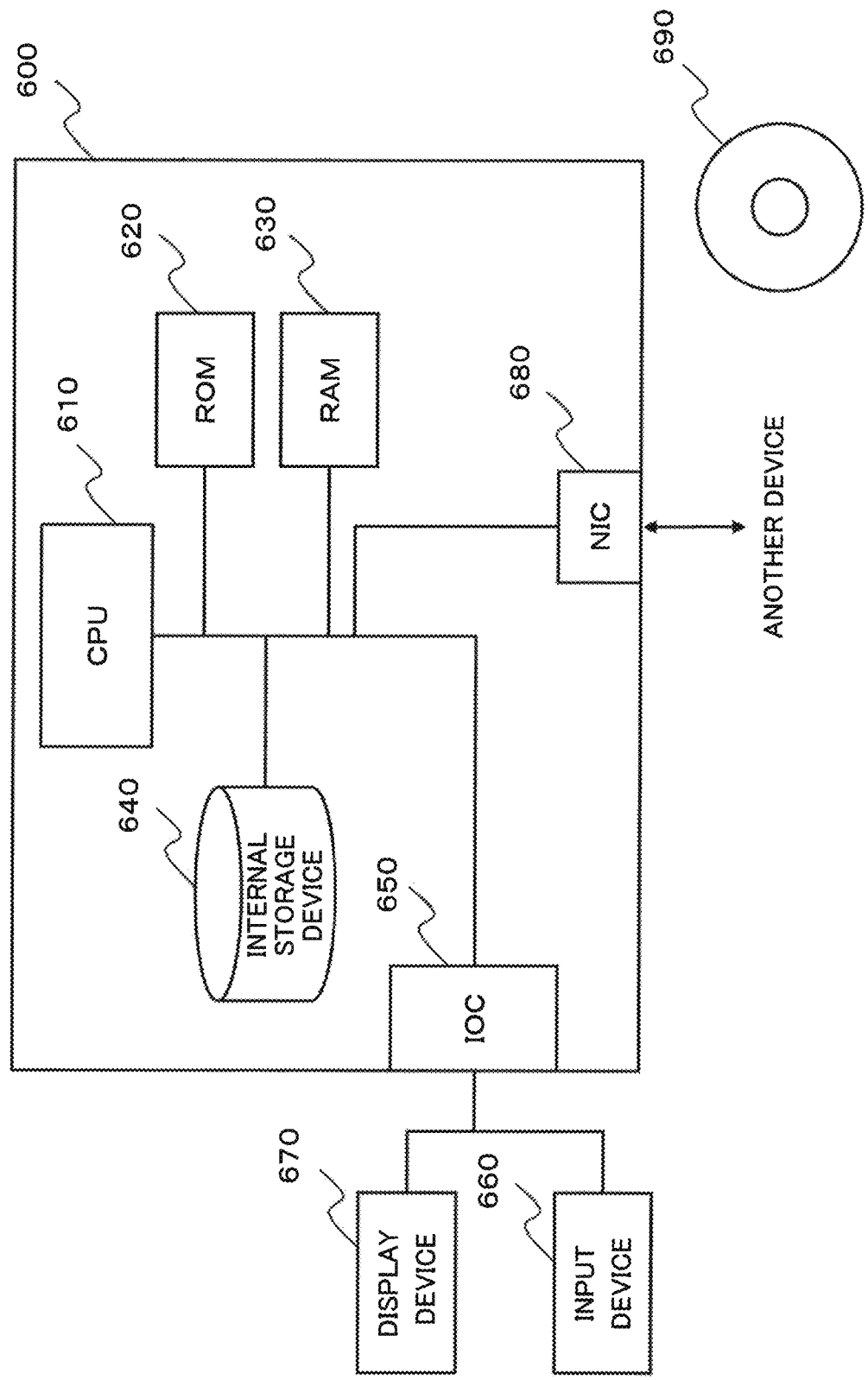
FIG. 24 is a block diagram exemplifying a hardware configuration of a data processing device.

FIG. 24 is a block diagram exemplifying a hardware configuration of a data processing device 600 which is an example of the data processing device 100.

The data processing device 600 includes a CPU 610, a ROM 620, a RAM 630, an internal storage device 640, an IOC 650 and a NIC 680, and configures a computer device.

The CPU 610 reads a program from the ROM 620. The CPU 610 then controls the RAM 630, the internal storage device 640, the IOC 650 and the NIC 680 based on the read program. A computer including the CPU 610 then controls these components and achieves each of the functions as the partition unit 101, the statistical value calculation unit 102, the determination unit 103 and the query execution unit 104 illustrated in FIG. 1. Alternatively, the computer including the CPU 610 controls these components and achieves each of the functions as the components illustrated in FIG. 2 or FIG. 18.

When achieving each of the functions, the CPU 610 may use the RAM 630 or the internal storage device 640 as a temporary memory for a program.

In addition, the CPU 610 may read, by using a not-illustrated storage medium reading device, a program included in a storage medium 690 storing the program in a computer-readable manner. Alternatively, the CPU 610 may receive a program from a not-illustrated external device via the NIC 680, save the program in the RAM 630, and operate based on the saved program.

The ROM 620 stores a program which is executed by the CPU 610 and static data. The ROM 620 is, for example, a Programmable-ROM (P-ROM) or a Flash ROM.

The RAM 630 temporarily stores a program which is executed by the CPU 610 and data. The RAM 630 is, for example, a Dynamic-RAM (D-RAM).

The internal storage device 640 stores data and a program which the data processing device 600 saves on a long-term. In addition, the internal storage device 640 may operate as a temporary memory device for the CPU 610. The internal storage device 640 is, for example, a hard disk device, a magneto-optical disk device, a Solid State Drive (SSD) or a disk array device.

Herein, the ROM 620 and the internal storage device 640 each are non-transitory storage media (recording media). On the other hand, the RAM 630 is a transitory storage medium. The CPU 610 is capable of operating based on a program stored in the ROM 620, the internal storage device 640 or the RAM 630. In other words, the CPU 610 is capable of operating by using the non-transitory storage medium or the transitory storage medium.

The IOC 650 mediates data between the CPU 610 and an input device 660 and between the CPU 610 and a display device 670. The IOC 650 is, for example, an IO interface card or a Universal Serial Bus (USB) card.

The input device 660 is a device which receives an input instruction from an operator of the data processing device 600. The input device 660 is, for example, a keyboard, a mouse or a touch panel.

The display device 670 is a device that displays information to an operator of the data processing device 600. The display device 670 is, for example, a liquid crystal display.

The NIC 680 relays exchange of data with a not-illustrated external device through a network. The NIC 680 is, for example, a Local Area Network (LAN) card.

The thus-configured data processing device 600 is able to obtain an advantageous effect similar to that of the data processing device 100.

The reason is that the CPU 610 of the data processing device 600 is able to achieve functions similar to that of the data processing device 100 based on a program.

Other Description of Exemplary Embodiments

The whole or part of the exemplary embodiments disclosed above can be described as, but not limited to, the following supplementary notes.

(Supplementary Note 1)

A data processing device includes:

a partition unit that horizontally partitions records included in table data into a plurality of blocks, the horizontal partitioning indicating partitioning that uses records as a unit;

a statistical value calculation unit that calculates, for each of the blocks, a statistical value of an attribute included in the records of the block;

a determination unit that determines, when processing a query for performing aggregation processing after record selection processing with respect to the table data, based on the statistical value, for each of the blocks, whether all records in the block are selected or not based on the selection processing; and a query execution unit that uses, for a block determined that all records are selected based on the determination unit, the statistical value of the determined block as a result of the query for the determined block.

(Supplementary Note 2)

The data processing device according to supplementary note 1, further includes:

a distribution information calculation unit that calculates distribution information approximating distribution of values for each attribute in each of the block, wherein the determination unit executes the determination by using the distribution information.

(Supplementary Note 3)

The data processing device according to supplementary note 2, wherein the distribution information calculation unit calculates a plurality of pieces of distribution information of a plurality of different pieces of information, and the determination unit executes the determination by using the plurality of pieces of distribution information.

(Supplementary Note 4)

The data processing device according to any one of supplementary notes 1 to 3, wherein the determination unit executes, when a selection condition of record selection processing is based on magnitude relation of an attribute, the determination by using a maximum value and a minimum value of the attribute acquired from the statistical value of each of the blocks.

(Supplementary Note 5)

The data processing device according to any one of supplementary notes 1 to 4, wherein the partition unit sorts the records included in the table data by an attribute frequently appearing in a conditional expression of selection processing in a past query, and horizontally partitions the post-sort table data into blocks.

(Supplementary Note 6)

A data processing method includes:

horizontally partitioning records included in table data into a plurality of blocks, the horizontal partitioning indicating partitioning that uses records as a unit;

calculating, for each of the blocks, a statistical value of an attribute included in the records of the block;

determining, when processing a query for performing aggregation processing after record selection processing with respect to the table data, based on the statistical value, for each of the blocks, whether all records in the block are selected or not based on the selection processing; and using, for a block determined that all records are selected based on the determination, the statistical value of the determined block as a result of the query for the determined block.

(Supplementary Note 7)

A computer readable non-transitory recording medium embodying a program, the program causing a computer device to perform a method, the method includes:

horizontally partitioning records included in table data into a plurality of blocks, the horizontal partitioning indicating partitioning that uses records as a unit;

calculating, for each of the blocks, a statistical value of an attribute included in the records of the block;

determining, when processing a query for performing aggregation processing after record selection processing with respect to the table data, based on the statistical value for each of the blocks, whether all records in the block are selected or not based on the selection processing; and using, for a block determined that all records are selected based on the determination processing, the statistical value of the determined block as a result of the query for the determined block.

This application is based upon and claims the benefit of priority from Japanese patent application No. 2014-166753, filed on Aug. 19, 2014, the disclosure of which is incorporated herein in its entirety by reference.

INDUSTRIAL APPLICABILITY

As an example of utilization of the present invention, a distributed data warehouse system can be mentioned. In the distributed data warehouse system, table data is horizontally partitioned and is distributedly arranged in a plurality of nodes. Thus, the use of the present invention accelerates aggregation processing on a distributed data warehouse.

REFERENCE SINGS LIST

100 Data processing device
101 Partition unit
102 Statistical value calculation unit
103 Determination unit
104 Query execution unit
110 Table data
120 Query
200 Data processing device
201 Table data input unit
202 File creation unit
203 Statistical value information calculation unit
204 Distribution information calculation unit
205 Query reception unit
206 Query execution unit
207 Statistical value usability determination unit
208 File storage unit
301 Table data
401 Table data
411 Block
414 Lightweight index
501 Retired table
511 Block
600 Data processing device
601 Query
602 Query
610 CPU
620 ROM
630 RAM
640 Internal storage device
650 IOC
660 Input device
670 Display device
680 NIC
690 Storage medium
700 Execution plan
701 Staff
702 Scan
703 $Max_{height}$
800 Execution plan
900 Execution plan
1000 Execution plan
1001 Retired
1002 $\sigma_{NOT\ EXISTS}$
1100 Execution plan
1200 Execution plan
1300 Execution plan
1401 Table data
1411 Block
1412 Block
1414 Lightweight index
1501 Table data
1511 Block
1800 Data processing device
1801 Distribution information storage unit
1900 Query
2001 Table data
2002 Attribute selection
2003 Solution
2101 Table data
2111 Block
2114 Lightweight index
2117 Maximum value
2200 Query
2301 Record

The invention claimed is:

1. A data processing device comprising:
a memory; and
at least one processor coupled to the memory,
the processor performing operations, the operations comprising:
horizontally partitioning records included in table data into a plurality of blocks, the horizontal partitioning indicating partitioning that uses records as a unit;
calculating, for each of the blocks, a statistical value of an attribute included in the records of the block;
calculating distribution information approximating a distribution of values for each attribute in each of the blocks, the distribution information being a bit fixed length;
determining, when processing a query for performing aggregation processing after record selection processing with respect to the table data, based on the statistical value, for each of the blocks, whether all records in the block are selected or not based on the selection processing by performing an AND operation using the distribution information being the bit string fixed length;

using, for a block determined that all records are selected, the statistical value of the determined block as a result of the query for the determined block.

2. The data processing device according to claim 1, wherein the operations further comprise:

calculating a plurality of pieces of distribution information of a plurality of different pieces of information; and executing determining, whether all records in the block are selected or not based on the selection processing, further by using the plurality of pieces of distribution information.

3. The data processing device according to claim 1, wherein the operations further comprise:

executing, when a selection condition of record selection processing is based on magnitude relation of an attribute, determining, whether all records in the block are selected or not based on the selection processing, by using a maximum value and a minimum value among each attribute acquired from the statistical value of each of the blocks.

4. The data processing device according to claim 1, wherein the operations further comprise:

sorting the records included in the table data by an attribute frequently appearing in a conditional expression of selection processing in a past query; and horizontally partitioning the post-sort table data into blocks.

5. A data processing method comprising:

horizontally partitioning records included in table data into a plurality of blocks, the horizontal partitioning indicating partitioning that uses records as a unit;

calculating, for each of the blocks, a statistical value of an attribute included in the records of the block;

calculating distribution information approximating a distribution of values for each attribute in each of the blocks, the distribution information being a bit string fixed length;

determining, when processing a query for performing aggregation processing after record selection processing with respect to the table data, based on the statistical value, for each of the blocks, whether all records in the block are selected or not based on the selection processing by performing an AND operation using the distribution information being the bit string fixed length; and using, for a block determined that all records are selected based on the determination, the statistical value of the determined block as a result of the query for the determined block.

6. A computer readable non-transitory recording medium embodying a program, the program causing a computer device to perform a method, the method comprising:

horizontally partitioning records included in table data into a plurality of blocks, the horizontal partitioning indicating partitioning that uses records as a unit;

calculating, for each of the blocks, a statistical value of an attribute included in the records of the block;

calculating distribution information approximating a distribution of values for each attribute in each of the blocks, the distribution information being a bit string fixed length;

determining, when processing a query for performing aggregation processing after record selection processing with respect to the table data, based on the statistical value for each of the blocks, whether all records in the block are selected or not based on the selection processing by performing an AND operation using the distribution information being the bit string fixed length;

using, for a block determined that all records are selected based on the determination processing, the statistical value of the determined block as a result of the query for the determined block.

* * * * *

UNITED STATES PATENT AND TRADEMARK OFFICE
CERTIFICATE OF CORRECTION

PATENT NO. : 10,621,173 B2
APPLICATION NO. : 15/503737
DATED : April 14, 2020
INVENTOR(S) : Masafumi Oyamada It is certified that error appears in the above-identified patent and that said Letters Patent is hereby corrected as shown below:

In the Claims

Column 16, Line 61; In Claim 1, after "bit", insert --string--

Signed and Sealed this
Fourteenth Day of July, 2020

Andrei Iancu
*Director of the United States Patent and Trademark Office*